(12) United States Patent
Kawaguchi

(10) Patent No.: US 11,514,307 B2
(45) Date of Patent: Nov. 29, 2022

(54) LEARNING APPARATUS, LEARNING METHOD, ESTIMATION APPARATUS, ESTIMATION METHOD, AND COMPUTER-READABLE STORAGE MEDIUM

(71) Applicant: Panasonic Intellectual Property Management Co., Ltd., Osaka (JP)

(72) Inventor: Kyoko Kawaguchi, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1127 days.

(21) Appl. No.: 16/116,954

(22) Filed: Aug. 30, 2018

(65) Prior Publication Data
US 2019/0073588 A1 Mar. 7, 2019

(30) Foreign Application Priority Data
Sep. 6, 2017 (JP) .............................. JP2017-171486

(51) Int. Cl.
*G06K 9/00* (2022.01)
*G06K 9/62* (2022.01)
(Continued)

(52) U.S. Cl.
CPC ............... *G06N 3/08* (2013.01); *G06K 9/628* (2013.01); *G06K 9/6232* (2013.01);
(Continued)

(58) Field of Classification Search
USPC ............... 706/47, 45, 48, 16, 15, 25, 41, 46
See application file for complete search history.

(56) References Cited

U.S. PATENT DOCUMENTS 9,384,450 B1 * 7/2016 Cordes ................... G06N 20/00
10,387,430 B2 * 8/2019 Goth, III ................ G06N 5/022
(Continued)

OTHER PUBLICATIONS

Geoffrey Hinton et al., "Distilling the Knowledge in a Neural Network", arXiv:1503.02531 in arXiv.org, Mar. 9, 2015, <URL: https://www.cs.toronto.edu/~hinton/absps/distillation.pdf>.

*Primary Examiner* — Daquan Zhao
(74) *Attorney, Agent, or Firm* — Greenblum & Bernstein, P.L.C.

(57) ABSTRACT

A learning apparatus includes a first learning unit, a learning data generator, and a second learning unit. The first learning unit implements a learning process for a first classifier such that a class applicable degree of a candidate class corresponding to a correct answer class becomes the maximum as compared with class applicable degrees of other candidate classes. The learning data generator performs a classification process for a classification target using the first classifier already subjected to the learning process, converts class applicable degrees of a plurality of candidate classes, which are output by the first classifier already subjected to the learning process into a dimensionally compressed value based on a predetermined compression rule, and generates second learning data in which the identification target is associated with the dimensionally compressed value. The second learning unit implements a learning process for a second classifier using the second learning data.

13 Claims, 20 Drawing Sheets

(51) Int. Cl.
- *G06N 20/00* (2019.01)
- *G06N 3/08* (2006.01)
- *G06N 3/04* (2006.01)
- *G06N 20/10* (2019.01)
- *G06N 7/08* (2006.01)
- *G06N 7/00* (2006.01)

(52) U.S. Cl.
CPC ......... *G06K 9/6268* (2013.01); *G06N 3/0454* (2013.01); *G06N 3/084* (2013.01); *G06N 20/00* (2019.01); *G06N 7/005* (2013.01); *G06N 20/10* (2019.01)

(56) References Cited

U.S. PATENT DOCUMENTS

| | | | | |
|---|---|---|---|---|
| 2003/0233369 A1* | 12/2003 | Sassano | ............... | G06K 9/6269 707/999.102 |
| 2015/0278580 A1* | 10/2015 | Sato | .................... | G06K 9/6255 382/118 |

* cited by examiner

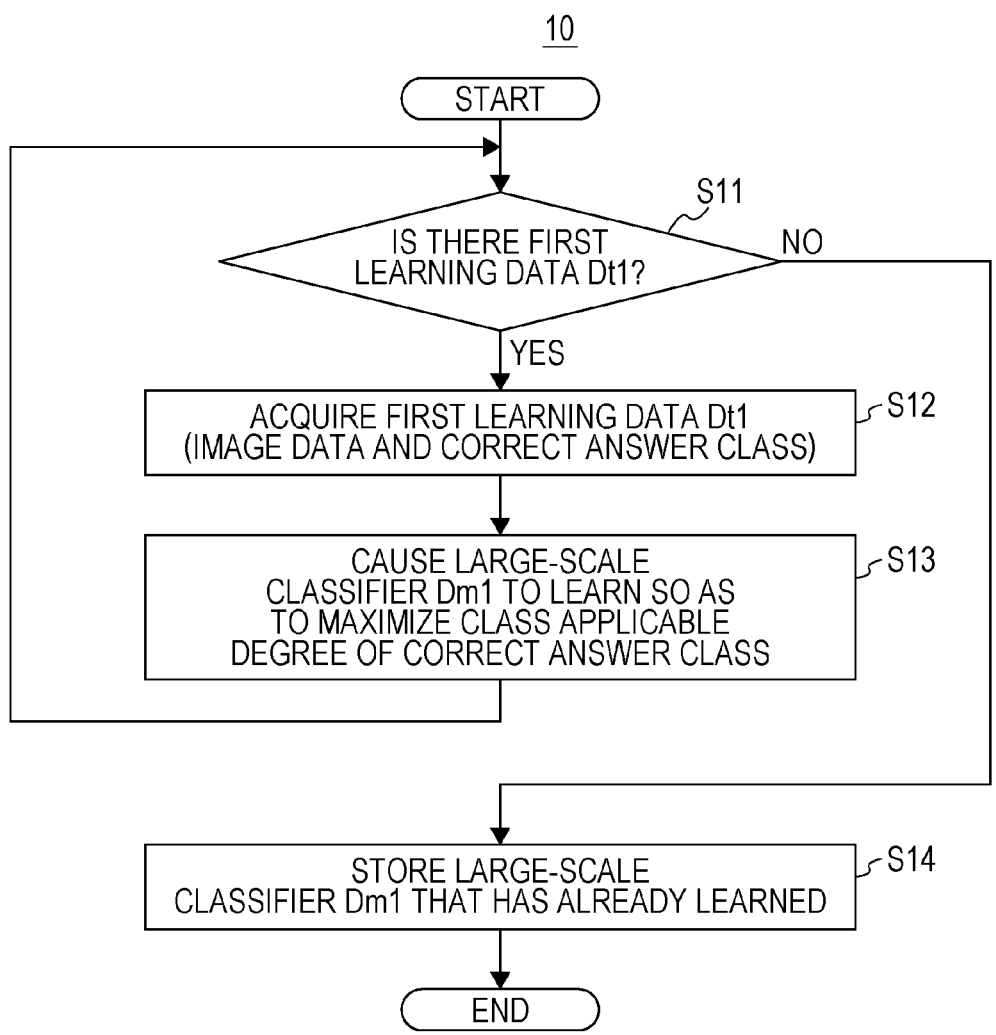

FIG. 8

| CLASS | CANDIDATE CLASS APPLICABLE DEGREE (HUMAN, BAGGAGE, EMPTY SEAT) | EXPLANATION | COMPRESSION TO ONE-DIMENSIONAL VALUE |
|---|---|---|---|
| HUMAN | (1, 0, 0) | TYPICAL HUMAN IMAGE | → 1 |
|  | (1, 0.5, 0) | HUMAN IMAGE LOOKING A LITTLE LIKE BAGGAGE | → 5/6 ≈ 0.83 |
|  | (1, 0.8, 0) | HUMAN IMAGE LOOKING LIKE BAGGAGE | → 4/6 ≈ 0.67 |
| BAGGAGE | (0.8, 1, 0) | BAGGAGE IMAGE LOOKING LIKE HUMAN | → 0.6 |
|  | (0, 1, 0) | TYPICAL BAGGAGE IMAGE | → 3/6 ≈ 0.5 |
|  | (0, 1, 0.8) | BAGGAGE IMAGE LOOKING LIKE EMPTY SEAT | → 0.4 |
| EMPTY SEAT | (0, 0.8, 1) | EMPTY SEAT IMAGE LOOKING LIKE BAGGAGE | → 2/6 ≈ 0.33 |
|  | (0, 0.5, 1) | EMPTY SEAT IMAGE LOOKING A LITTLE LIKE BAGGAGE | → 1/6 ≈ 0.17 |
|  | (0, 0, 1) | TYPICAL EMPTY SEAT IMAGE | → 0/6 = 0 |

FIG. 17A

| CORRECT ANSWER CLASS \ CANDIDATE CLASS | HUMAN LIKELIHOOD (DISPERSION OF CLASS APPLICABLE DEGREE) | BAGGAGE LIKELIHOOD (DISPERSION OF CLASS APPLICABLE DEGREE) | EMPTY SEAT LIKELIHOOD (DISPERSION OF CLASS APPLICABLE DEGREE) |
|---|---|---|---|
| HUMAN DATA | $2.6 \times 10^{-5}$ | $1.3 \times 10^{-4}$ | $1.9 \times 10^{-6}$ |
| BAGGAGE DATA | $3.3 \times 10^{-4}$ | $8.6 \times 10^{-5}$ | $1.7 \times 10^{-4}$ |
| EMPTY SEAT DATA | $2.5 \times 10^{-6}$ | $7.6 \times 10^{-4}$ | $3.1 \times 10^{-5}$ |

FIG. 17B

| CORRECT ANSWER CLASS \ CANDIDATE CLASS | HUMAN LIKELIHOOD (DISPERSION OF CLASS APPLICABLE DEGREE) | BAGGAGE LIKELIHOOD (DISPERSION OF CLASS APPLICABLE DEGREE) | EMPTY SEAT LIKELIHOOD (DISPERSION OF CLASS APPLICABLE DEGREE) |
|---|---|---|---|
| HUMAN DATA | [$2.6 \times 10^{-5}$] | $1.3 \times 10^{-4}$ | $1.9 \times 10^{-6}$ |
| BAGGAGE DATA | $3.3 \times 10^{-4}$ | [$8.6 \times 10^{-5}$] | $1.7 \times 10^{-4}$ |
| EMPTY SEAT DATA | $2.5 \times 10^{-6}$ | $7.6 \times 10^{-4}$ | [$3.1 \times 10^{-5}$] |

EXCLUSION N1, EXCLUSION N1, EXCLUSION N1
EXCLUSION N2, EXCLUSION N2

FIG. 17C

| CORRECT ANSWER CLASS \ CANDIDATE CLASS | HUMAN LIKELIHOOD (DISPERSION OF CLASS / APPLICABLE DEGREE) | BAGGAGE LIKELIHOOD (DISPERSION OF CLASS / APPLICABLE DEGREE) | EMPTY SEAT LIKELIHOOD (DISPERSION OF CLASS / APPLICABLE DEGREE) |
|---|---|---|---|
| HUMAN DATA | $2.6 \times 10^{-5}$ | $1.3 \times 10^{-4}$ | $1.9 \times 10^{-6}$ |
| BAGGAGE DATA | $3.3 \times 10^{-4}$ | $8.6 \times 10^{-5}$ | $1.7 \times 10^{-4}$ |
| EMPTY SEAT DATA | $2.5 \times 10^{-6}$ | $7.6 \times 10^{-4}$ | $3.1 \times 10^{-5}$ |

COUPLING N3

FIG. 17D

| CORRECT ANSWER CLASS \ CANDIDATE CLASS | HUMAN LIKELIHOOD (DISPERSION OF CLASS / APPLICABLE DEGREE) | BAGGAGE LIKELIHOOD (DISPERSION OF CLASS / APPLICABLE DEGREE) | EMPTY SEAT LIKELIHOOD (DISPERSION OF CLASS / APPLICABLE DEGREE) |
|---|---|---|---|
| HUMAN DATA | $2.6 \times 10^{-5}$ | $1.3 \times 10^{-4}$ | $1.9 \times 10^{-6}$ |
| BAGGAGE DATA | $3.3 \times 10^{-4}$ | $8.6 \times 10^{-5}$ | $1.7 \times 10^{-4}$ |
| EMPTY SEAT DATA | $2.5 \times 10^{-6}$ | $7.6 \times 10^{-4}$ | $3.1 \times 10^{-5}$ |

COUPLING N4
COUPLING N3
COUPLING N4

FIG. 17E

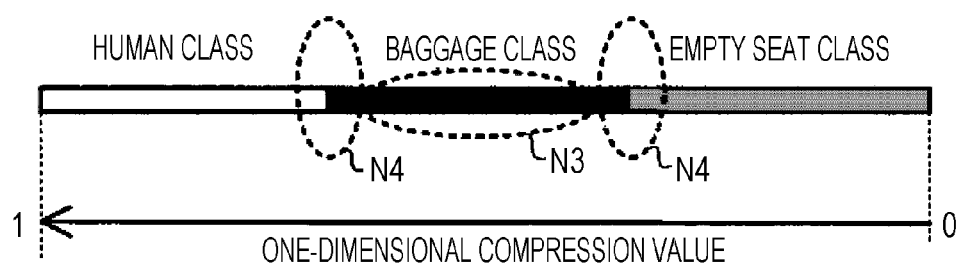

FIG. 18A

| CORRECT ANSWER CLASS \ CANDIDATE CLASS | A LIKELIHOOD (DISPERSION OF CLASS / APPLICABLE DEGREE) | B LIKELIHOOD (DISPERSION OF CLASS / APPLICABLE DEGREE) | C LIKELIHOOD (DISPERSION OF CLASS / APPLICABLE DEGREE) | D LIKELIHOOD (DISPERSION OF CLASS / APPLICABLE DEGREE) |
|---|---|---|---|---|
| DATA A | $5 \times 10^{-6}$ | $1 \times 10^{-3}$ | $5 \times 10^{-6}$ | $5 \times 10^{-6}$ |
| DATA B | $1 \times 10^{-3}$ | $5 \times 10^{-6}$ | $1 \times 10^{-3}$ | $5 \times 10^{-6}$ |
| DATA C | $5 \times 10^{-6}$ | $1 \times 10^{-3}$ | $5 \times 10^{-6}$ | $1 \times 10^{-3}$ |
| DATA D | $5 \times 10^{-6}$ | $5 \times 10^{-6}$ | $1 \times 10^{-3}$ | $5 \times 10^{-6}$ |

FIG. 18B

| CORRECT ANSWER CLASS \ CANDIDATE CLASS | A LIKELIHOOD (DISPERSION OF CLASS / APPLICABLE DEGREE) | B LIKELIHOOD (DISPERSION OF CLASS / APPLICABLE DEGREE) | C LIKELIHOOD (DISPERSION OF CLASS / APPLICABLE DEGREE) | D LIKELIHOOD (DISPERSION OF CLASS / APPLICABLE DEGREE) |
|---|---|---|---|---|
| DATA A | [$5 \times 10^{-6}$] | $1 \times 10^{-3}$ | $5 \times 10^{-6}$ | $5 \times 10^{-6}$ |
| DATA B | $1 \times 10^{-3}$ | [$5 \times 10^{-6}$] | $1 \times 10^{-3}$ | $5 \times 10^{-6}$ |
| DATA C | $5 \times 10^{-6}$ | $1 \times 10^{-3}$ | [$5 \times 10^{-6}$] | $1 \times 10^{-3}$ |
| DATA D | $5 \times 10^{-6}$ | $5 \times 10^{-6}$ | $1 \times 10^{-3}$ | [$5 \times 10^{-6}$] |

EXCLUSION N1, EXCLUSION N1, EXCLUSION T1, EXCLUSION N2, EXCLUSION T1, EXCLUSION T2

FIG. 18C

| CORRECT ANSWER CLASS \ CANDIDATE CLASS | A LIKELIHOOD (DISPERSION OF CLASS APPLICABLE DEGREE) | B LIKELIHOOD (DISPERSION OF CLASS APPLICABLE DEGREE) | C LIKELIHOOD (DISPERSION OF CLASS APPLICABLE DEGREE) | D LIKELIHOOD (DISPERSION OF CLASS APPLICABLE DEGREE) |
|---|---|---|---|---|
| DATA A | $5 \times 10^{-6}$ | $1 \times 10^{-3}$ | $5 \times 10^{-6}$ | $5 \times 10^{-6}$ |
| DATA B | $1 \times 10^{-3}$ | $5 \times 10^{-6}$ | $1 \times 10^{-3}$ | $5 \times 10^{-6}$ |
| DATA C | $5 \times 10^{-6}$ | $1 \times 10^{-3}$ | $5 \times 10^{-6}$ | $1 \times 10^{-3}$ |
| DATA D | $5 \times 10^{-6}$ | $5 \times 10^{-6}$ | $1 \times 10^{-3}$ | $5 \times 10^{-6}$ |

COUPLING N4  COUPLING N4  COUPLING N4
COUPLING N3  COUPLING N3

FIG. 18D

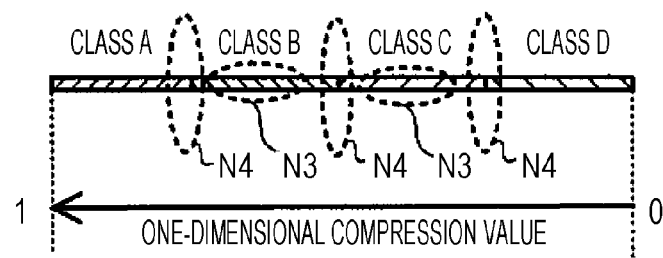

LEARNING APPARATUS, LEARNING METHOD, ESTIMATION APPARATUS, ESTIMATION METHOD, AND COMPUTER-READABLE STORAGE MEDIUM

The present application claims the benefit of foreign priority of Japanese patent application 2017-171486 filed on Sep. 6, 2017, the contents all of which are incorporated herein by reference.

BACKGROUND

1. Technical Field

The present disclosure relates to a learning apparatus, a learning method, an estimation apparatus, an estimation method, and a computer-readable storage medium.

2. Background Art

Heretofore, there has been known a classifier (for example, a neural network, a support vector machine (SVM) or the like) for classifying a class to which a classification target (for example, a type and state of an object in an image) belongs. This type of classifier is given with a classification function by machine learning.

In recent years, in order to shorten a learning time, various techniques of machine learning have been examined, and a technique called "dark knowledge" (also called "distilling") has attracted attention (refer to Geoffrey Hinton, et al. "Distilling the Knowledge in a Neural Network", arXiv: 1503.02531 in arXiv.org, 2015 (URL: https://www.cs.toronto.edu/~hinton/absps/distillation.pdf)). A dark knowledge learning system performs machine learning of a highly accurate large-scale classifier, and thereafter, performs machine learning of a small-scale classifier using the large-scale classifier.

FIG. 1 is a diagram briefly explaining the dark knowledge learning system.

In the dark knowledge learning system, first, the machine learning of the large-scale classifier is performed by machine learning of a class classification method, for example, using learning data in which such classification targets as images and a correct answer class are associated with each other (STEP 1).

In the machine learning of the class classification method, a learning process is implemented for the large-scale classifier such that a class applicable degree of a candidate class corresponding to the correct answer class becomes the maximum as compared with class applicable degrees of other candidate classes. The class applicable degree indicates a probability that each of the classification targets applies to the candidate class estimated from input information of the classification target (the same applies to the following).

In the machine learning of the class classification method, for example, if an S class is the correct answer class, when a class applicable degree of the S class is the maximum, network parameters (weighting factor, bias, and the like) are not updated. Meanwhile, when a class applicable degree of a T class is the maximum, the network parameters (weighting factor, bias, and the like) are updated such that the class applicable degree of the S class becomes the maximum. Likewise, when a class applicable degree of a U class is the maximum, the network parameters (weighting factor, bias, and the like) are updated such that the class applicable degree of the S class becomes the maximum. When the network parameters are updated such that the class applicable degree of the S class becomes the maximum, the class applicable degrees of the U class and the T class are not particularly considered.

By repeatedly executing such a process as above, the large-scale classifier is configured such that the class applicable degree of each of candidate classes S, T, U is capable of accurately outputting a Bayesian probability corresponding to an input feature of the classification target.

In the dark knowledge learning system, next, learning data for the small-scale classifier is generated using the large-scale classifier that has already been subjected to the learning process (STEP 2).

This learning data generation process is, for example, a process for inputting an image to the large-scale classifier that has already been subjected to the learning process and for acquiring the class applicable degrees of the respective candidate classes, which are output by respective output elements of the large-scale classifier. Then, data (also called a soft target) in which the input image and the class applicable degrees of respective candidate classes S, T, U are associated with each other are generated as the learning data for the small-scale classifier.

In the dark knowledge learning system, next, machine learning of the small-scale classifier is performed by machine learning of a regression method using the learning data for the small-scale classifier, which is generated in STEP 2 (STEP 3).

In the machine learning by the regression method, for example, values of the learning data generated in STEP 2 are set as correct answer values (class applicable degrees of respective candidate classes S, T, U) individually for an output element of the small-scale classifier, which outputs the class applicable degree of the S class, an output element thereof, which outputs the class applicable degree of the T class, and an output element thereof, which outputs the class applicable degree of the U class. Then, the network parameters (weighting factor, bias, and the like) are updated such that the respective output elements output the correct answer values upon receiving the image of the learning data.

By repeatedly executing such a process as above, the output elements of respective candidate classes S, T, U of the small-scale classifier become capable of obtaining class applicable degrees similar to those of the large-scale classifier.

As described above, in accordance with the dark knowledge learning system, the small-scale classifier with similar accuracy to that of the large-scale classifier can be composed of the small-scale classifier smaller than the large-scale classifier. Here, for example, in the small-scale classifier, a number of intermediate layers is small, and a number of elements in each of the intermediate layers is also small. Moreover, the small-scale classifier is capable of holding the classification function by less learning data since the small-scale classifier performs the machine learning using the regression method.

SUMMARY

The present disclosure provides a learning apparatus, a learning method, an estimation apparatus, an estimation method, and a computer-readable storage medium, which make it possible to achieve further miniaturization of the classifier.

In one aspect, the present disclosure discloses a learning apparatus including a first learning unit, a learning data generator, and a second learning unit. The first learning unit implements a first learning process for a first classifier such that, when the first classifier performs an classification process for classifying an classification target into a plurality of candidate classes including a correct answer class of the classification target and other candidate classes using first learning data in which the classification target is associated with the correct answer class, a class applicable degree of a candidate class corresponding to the correct answer class becomes maximum as compared with class applicable degrees of the other candidate classes. The class applicable degree is output as a result of the classification process by the first classifier. The learning data generator performs the classification process for the classification target using the first classifier already subjected to the first learning process, converts class applicable degrees of the plurality of candidate classes into a dimensionally compressed value based on a predetermined compression rule, and generates second learning data in which the classification target is associated with the dimensionally compressed value. The class applicable degrees are output as the result of the classification process by the first classifier already subjected to the first learning process. The second learning unit implements a second learning process for a second classifier different from the first classifier such that, when the second classifier performs the classification process for the classification target using the second learning data, class applicable degrees of the plurality of candidate classes become the dimensionally compressed value. The class applicable degrees are output as a result of the classification process by the second classifier.

In another aspect, the present disclosure discloses an estimation apparatus. The estimation apparatus performs the classification process for the classification target to be input using the second classifier already subjected to the second learning process described above, and classifies the classification target into any of the plurality of candidate classes based on the predetermined compression rule and the dimensionally compressed value from the plurality of candidate classes. The dimensionally compressed value is output as the result of the classification process by the second classifier already subjected to the second learning process.

In still another aspect, the present disclosure discloses a learning method. The learning method includes implementing a first learning process for a first classifier such that, when the first classifier performs an classification process for classifying an classification target into a plurality of candidate classes including a correct answer class of the classification target and other candidate classes using first learning data in which the classification target is associated with the correct answer class, a class applicable degree of a candidate class corresponding to the correct answer class becomes maximum as compared with class applicable degrees of the other candidate classes. The class applicable degree is output as a result of the classification process by the first classifier. Moreover, the learning method includes performing the classification process for the classification target using the first classifier already subjected to the first learning process, converting class applicable degrees of the plurality of candidate classes into a dimensionally compressed value based on a predetermined compression rule, and generating second learning data in which the classification target is associated with the dimensionally compressed value. The class applicable degrees are output as the result of the classification process by the first classifier already subjected to the first learning process. Furthermore, the learning method includes implementing a second learning process for a second classifier different from the first classifier such that, when the second classifier performs the classification process for the classification target using the second learning data, class applicable degrees of the plurality of candidate classes become the dimensionally compressed value. The class applicable degrees are output as a result of the classification process by the second classifier.

In yet another aspect, the present disclosure discloses an estimation method. The estimation method includes performing the classification process for the classification target to be input using the second classifier already subjected to the second learning process described above, and classifying the classification target into any of the plurality of candidate classes based on the predetermined compression rule and the dimensionally compressed value from the plurality of candidate classes. The dimensionally compressed value is output as the result of the classification process by the second classifier already subjected to the second learning process.

In a further aspect, the present disclosure discloses a non-transitory computer-readable storage medium recording a learning program. The learning program causes the computer to execute implementing a first learning process for a first classifier such that, when the first classifier performs an classification process for classifying an classification target into a plurality of candidate classes including a correct answer class of the classification target and other candidate classes using first learning data in which the classification target is associated with the correct answer class, a class applicable degree of a candidate class corresponding to the correct answer class becomes maximum as compared with class applicable degrees of the other candidate classes. The class applicable degree is output as a result of the classification process by the first classifier. Moreover, the learning program causes the computer to execute performing the classification process for the classification target using the first classifier already subjected to the first learning process, converting class applicable degrees of the plurality of candidate classes into a dimensionally compressed value based on a predetermined compression rule, and generating second learning data in which the classification target is associated with the dimensionally compressed value. The class applicable degrees are output as the result of the classification process by the first classifier already subjected to the first learning process. Furthermore, the learning program causes the computer to execute implementing a second learning process for a second classifier different from the first classifier such that, when the second classifier performs the classification process for the classification target using the second learning data, class applicable degrees of the plurality of candidate classes become the dimensionally compressed value. The class applicable degrees are output as a result of the classification process by the second classifier.

In a still further aspect, the present disclosure discloses a non-transitory computer-readable storage medium recording an estimation program. The estimation program causes the computer to execute performing the classification process for the classification target to be input using the second classifier already subjected to the second learning process described above, and classifying the classification target into any of the plurality of candidate classes based on the predetermined compression rule and the dimensionally compressed value from the plurality of candidate classes, the dimensionally compressed value being output as the result of the classification process by the second classifier already subjected to the second learning process.

According to the present disclosure, it is possible to achieve the further miniaturization of the classifier.

BRIEF DESCRIPTION OF DRAWINGS

FIG. 5 is a flowchart illustrating an example of a process performed by a first learning unit according to the first exemplary embodiment;

FIG. 8 is a view explaining the example of the compression rule according to the first exemplary embodiment;

FIG. 17A is a view illustrating a data table referred to by the compression rule generator according to the second exemplary embodiment;

FIG. 17B is a view illustrating a data table referred to by the compression rule generator according to the second exemplary embodiment;

FIG. 17C is a view illustrating a data table referred to by the compression rule generator according to the second exemplary embodiment;

FIG. 17D is a view illustrating a data table referred to by the compression rule generator according to the second exemplary embodiment;

FIG. 17E is a view illustrating a data table referred to by the compression rule generator according to the second exemplary embodiment;

FIG. 18A is a table schematically illustrating a process of a compression rule generator according to a modification of the second exemplary embodiment;

FIG. 18B is a table schematically illustrating the process of the compression rule generator according to the modification of the second exemplary embodiment;

FIG. 18C is a table schematically illustrating the process of the compression rule generator according to the modification of the second exemplary embodiment; and FIG. 18D is a view schematically illustrating the process of the compression rule generator according to the modification of the second exemplary embodiment.

DETAILED DESCRIPTION OF PREFERRED EMBODIMENTS

Figure 1:
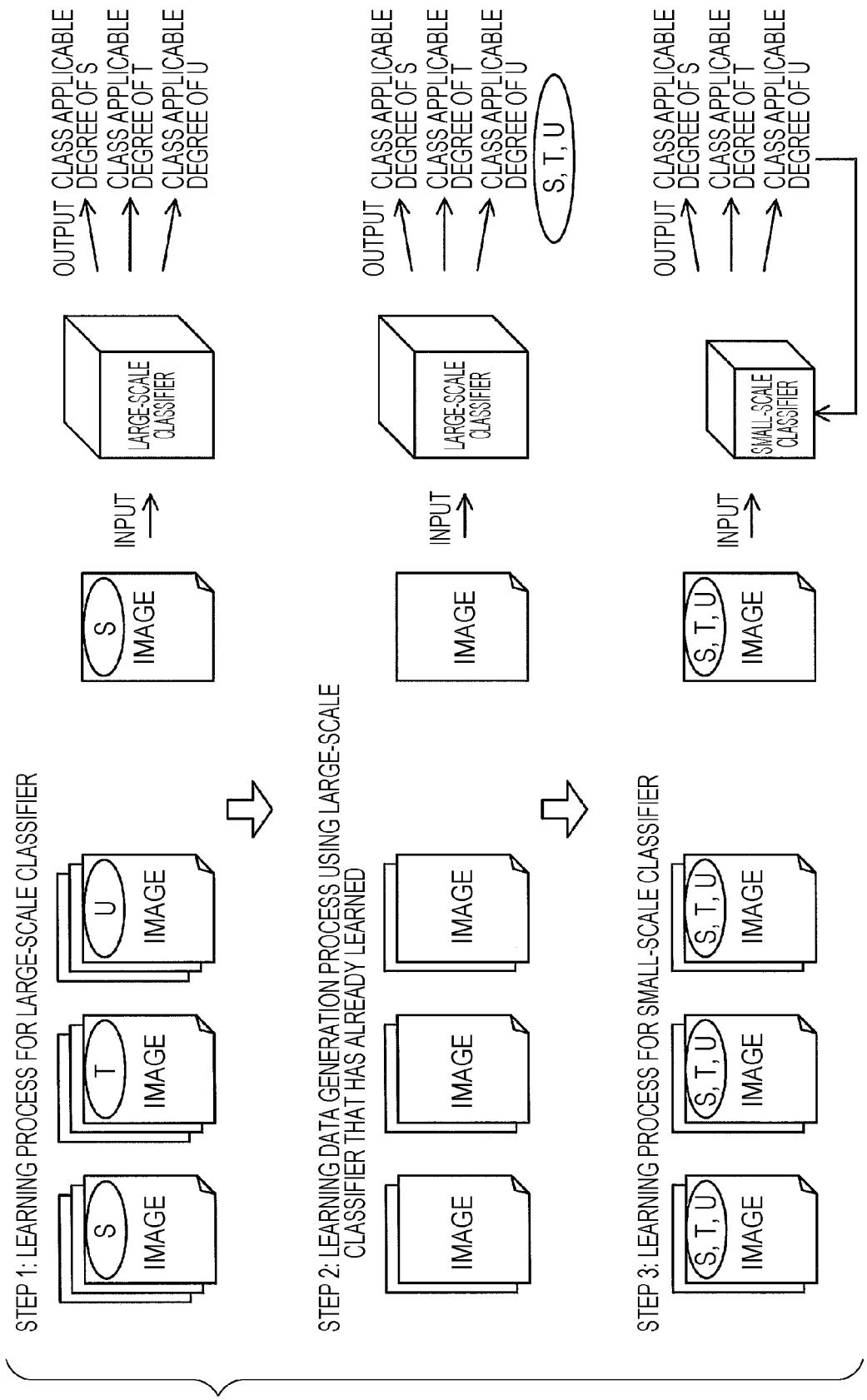
FIG. 1 is a diagram briefly explaining a dark knowledge learning system.

Prior to describing exemplary embodiments of the present disclosure, problems found in a conventional technique will be briefly described herein. A classifier is required to be further miniaturized from viewpoints of accelerating a learning process and of accelerating a classification process. However, in the small-scale classifier generated in the dark knowledge learning system according to the conventional technology, output elements not less in number than those of the large-scale classifier are required. Accordingly, the miniaturization of the classifier is limited.

Hereinafter, preferred exemplary embodiments of the present disclosure will be described in detail with reference to the drawings. In this specification and the drawings, constituents provided with substantially the same functional configurations are denoted by the same reference numerals, whereby a duplicate description will be omitted.

First Exemplary Embodiment

[Overall Configuration of Learning Apparatus]

Hereinafter, an example of a configuration of learning apparatus 1 according to a first exemplary embodiment will be described with reference to FIG. 2 to FIG. 4.

Figure 2:
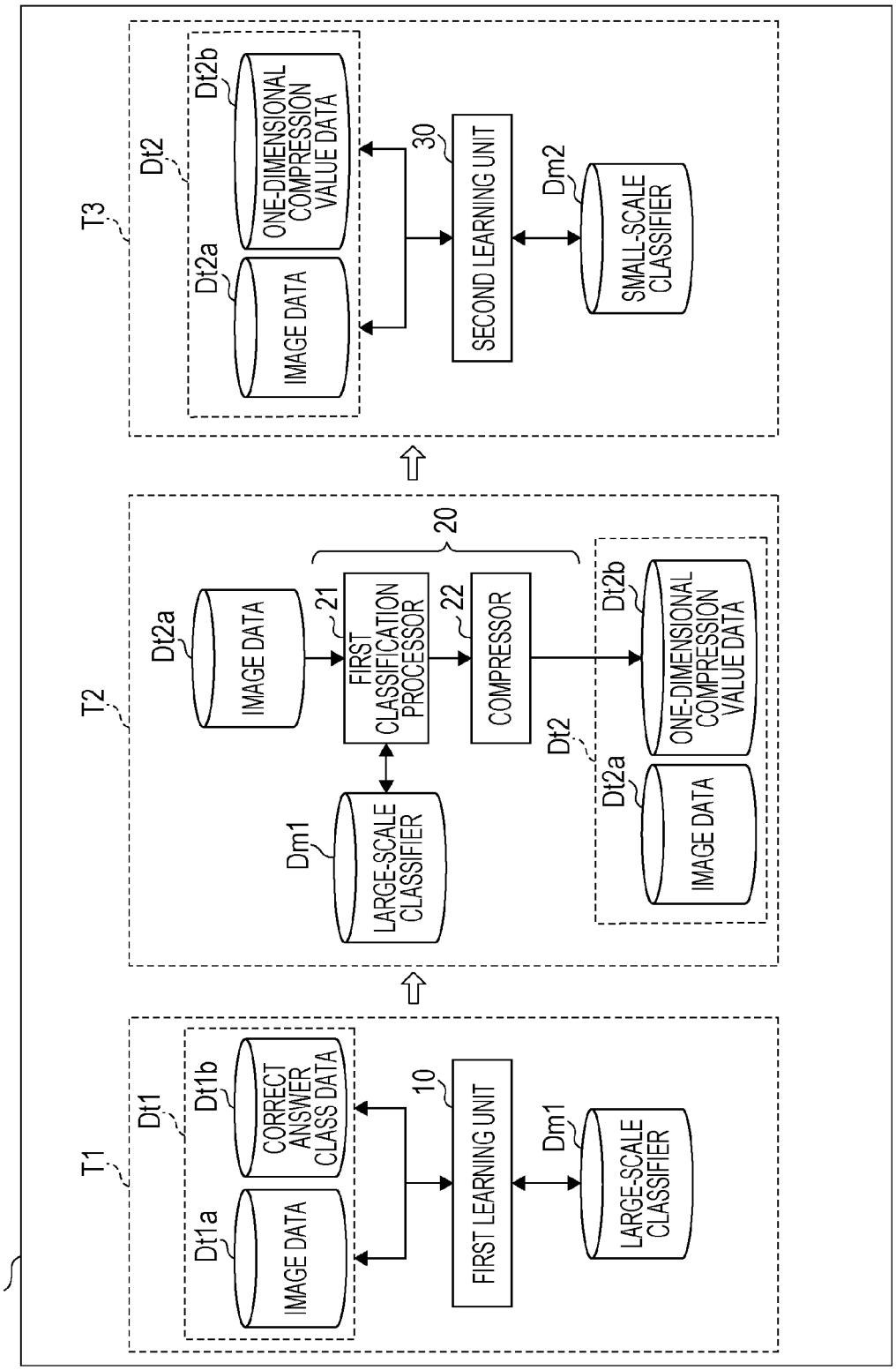
FIG. 2 is a block diagram illustrating an overall configuration of a learning apparatus according to a first exemplary embodiment.

FIG. 2 is a block diagram illustrating an overall configuration of learning apparatus 1 according to the present exemplary embodiment.

Learning apparatus 1 according to the present exemplary embodiment is a learning apparatus for implementing a learning process for large-scale classifier Dm1 (corresponding to a "first classifier" of the present disclosure) and small-scale classifier Dm2 (corresponding to a "second classifier" of the present disclosure). Learning apparatus 1 includes: first learning unit 10; learning data generator 20; and second learning unit 30.

Learning apparatus 1 according to the present exemplary embodiment uses a similar method to that of the dark knowledge learning system described above. First, learning apparatus 1 performs machine learning of large-scale classifier Dm1 in first learning unit 10 (phase T1). Thereafter, in learning data generator 20, learning apparatus 1 generates learning data for small-scale classifier Dm2 using large-scale classifier Dm1 already subjected to the learning process (Phase T2). Then, in second learning unit 30, learning apparatus 1 performs machine learning of small-scale classifier Dm2 using the learning data (Phase T3). Then, learning apparatus 1 delivers finally obtained model data regarding small-scale classifier Dm2 that has already learned to estimation apparatus 2 (refer to FIG. 11), where an classification process using small-scale classifier Dm2 is executed.

Reference symbols T1, T2, and T3 in FIG. 2 denote the phases of the process executed by learning apparatus 1 according to the present exemplary embodiment. Phases T1, T2, and T3 are executed respectively by first learning unit 10, learning data generator 20, and second learning unit 30.

Moreover, reference symbols Dt1 and Dt2 in FIG. 2 denote respectively learning data when the learning process is implemented for large-scale classifier Dm1 (hereinafter, the learning data will be referred to as "first learning data Dt1") and learning data when the learning process is implemented for small-scale classifier Dm2 (hereinafter, the learning data will be referred to as "second learning data Dt2").

First learning data Dt1 stores image data Dt1a of classification targets and correct answer class data Dt1b (also referred to as a correct answer label) in association with each other. Second learning data Dt2 stores image data Dt2a and one-dimensional compression value data Dt2b (to be detailed later) in association with each other.

Reference symbols Dm1 and Dm2 in FIG. 2 denote respectively, for example, model data of a neural network constituting the large-scale classifier (for example, the model data is data regarding input layers, intermediate layers and output layers) and model data of a neural network constituting the small-scale classifier (this model data will be detailed later).

Figure 3:
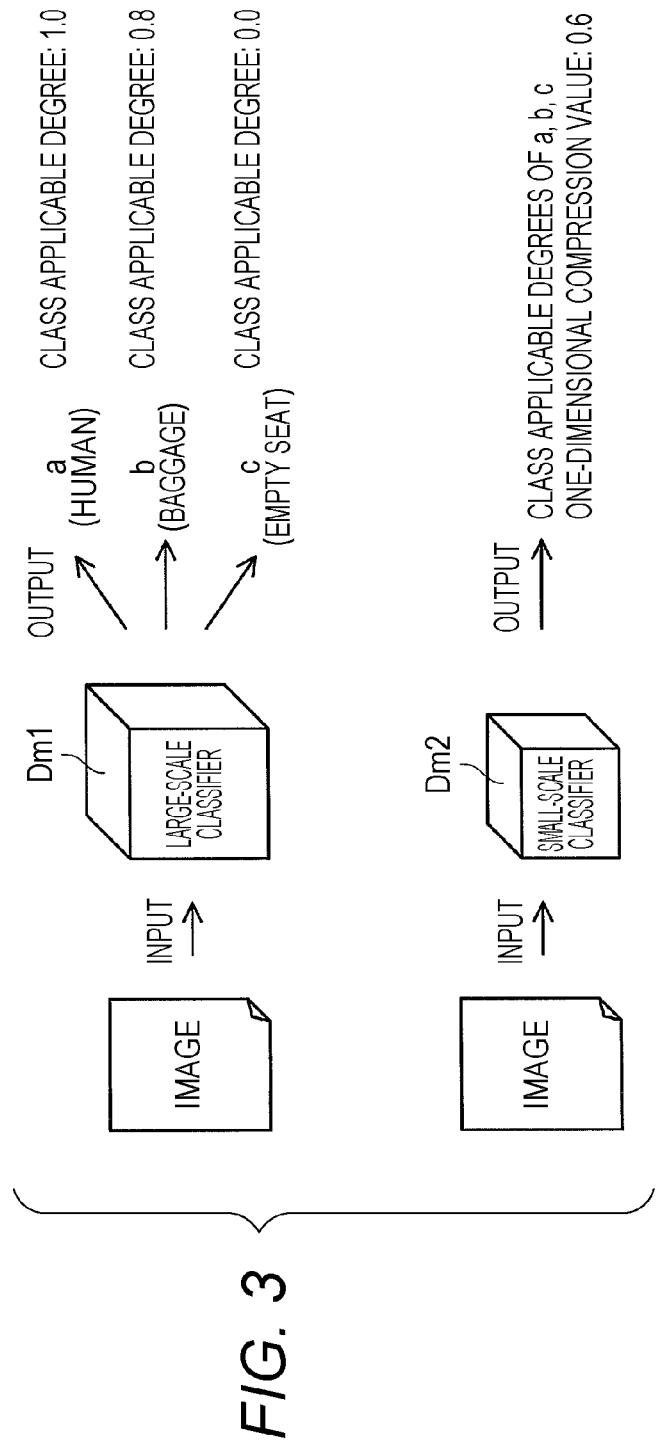
FIG. 3 is a view explaining a large-scale classifier and a small-scale classifier according to the first exemplary embodiment.

FIG. 3 is a view explaining large-scale classifier Dm1 and small-scale classifier Dm2 according to the present exemplary embodiment.

Large-scale classifier Dm1 and small-scale classifier Dm2 are composed by including the neural network, for example. However, as large-scale classifier Dm1 and small-scale classifier Dm2, other learning instruments such as a support vector machine (SVM) and a Bayesian classifier can also be used without being limited to the neural network. Besides the above, as large-scale classifier Dm1 and small-scale classifier Dm2, an ensemble model may be used. Moreover, large-scale classifier Dm1 and small-scale classifier Dm2 may be composed by combining plural types of classifiers, or may be composed by being combined with a preprocessor for a region segmentation process or a color segmentation process, for example.

The "classification target" to be classified by large-scale classifier Dm1 and small-scale classifier Dm2 may be an arbitrary target such as a voice, an image and a moving picture, and sensing data of a distance and a temperature, for example.

In the present exemplary embodiment, an classification mode will be described as an example. In the classification mode, an image obtained by photographing an interior space of a vehicle is defined as the "classification target". Then, on the basis of the image, it is classified which of the following three classes the classification target applies to: "a state in which a person is present on a passenger's seat of the vehicle (hereinafter, human class a)"; "a state in which a baggage is placed on the passenger's seat of the vehicle (hereinafter, baggage class b)"; and "a state in which the passenger's seat of the vehicle is empty (hereinafter, empty seat class c).

Large-scale classifier Dm1 according to the present exemplary embodiment includes a plurality of output elements for outputting class applicable degrees of candidate classes a, b, c into which the classification target is classified. For the respective output elements of large-scale classifier Dm1, for example, a softmax function or the like is used as a function capable of expressing a probability.

In the case of performing the classification process using large-scale classifier Dm1, such a candidate class (human class a in FIG. 3) in which the class applicable degree is the maximum among candidate classes a, b, c serves as an classification result of the classification target.

Meanwhile, small-scale classifier Dm2 according to the present exemplary embodiment is configured to classify the classification target into any of candidate classes a, b, c like large-scale classifier Dm1. However, unlike large-scale classifier Dm1, small-scale classifier Dm2 is configured to output the class applicable degrees of the candidate classes a, b, and c in a state of compression into a one-dimensional value (hereinafter, this one-dimensional value will also be referred to as a "one-dimensional compression value"). The compression will be described later with reference to FIGS. 7A and 7B. Note that, for the output element of small-scale classifier Dm2, for example, the sigmoid function or the like may be used as a function capable of outputting a continuous value.

In the case of performing the classification process using small-scale classifier Dm2, for example, the one-dimensional compression value is restored to the class applicable degrees of candidate classes a, b, c. For example, a one-dimensional compression value 0.6 is restored to a class applicable degree 1.0 of human class a, to a class applicable degree 0.8 of baggage class b, and to a class applicable degree 0.0 of empty seat class c. Then, the candidate class in which the class applicable degree is the maximum is determined to be the class to which the classification target belongs (will be detailed later).

As described above, learning apparatus 1 according to the present exemplary embodiment configures small-scale classifier Dm2 capable of outputting the class applicable degrees of candidate classes a, b, c in the state of compression to the one-dimensional value, thereby achieving the miniaturization of small-scale classifier Dm2.

Note that a number of intermediate layers and a number of elements in each of the intermediate layers are set larger in large-scale classifier Dm1 than in small-scale classifier Dm2. For example, Google Net known in public can be used as large-scale classifier Dm1, and AlexNet, Network In Network, or the like can be used as small-scale classifier Dm2.

Moreover, for example, large-scale classifier Dm1 and small-scale classifier Dm2 are configured to perform a feature vector extraction process such as a convolution neural network and a histogram of oriented gradients (HOG) extraction process for the classification target (input image), and to thereafter execute the classification process based on such a feature vector. Such a feature extraction process is similar to that in a technique known in public, and accordingly, a detailed description thereof will be omitted here.

Figure 4:
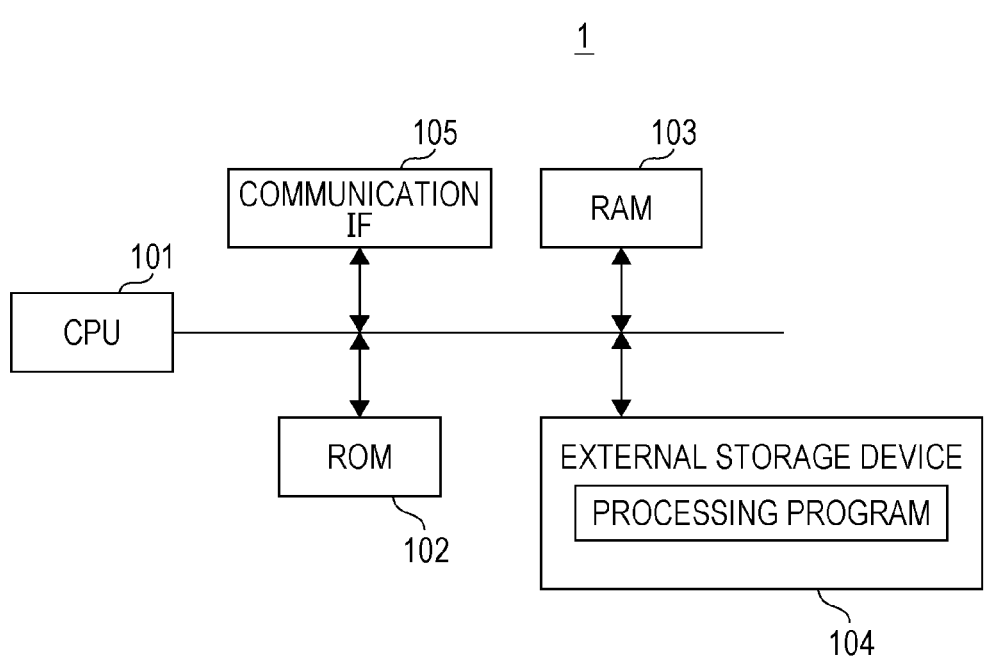
FIG. 4 is a diagram illustrating an example of a hardware configuration of the learning apparatus according to the first exemplary embodiment.

FIG. 4 is a diagram illustrating an example of a hardware configuration of learning apparatus 1 according to the present exemplary embodiment.

Learning apparatus 1 is a computer including, as main components, central processing unit (CPU) 101, read only memory (ROM) 102, a random access memory (RAM) 103, external storage (for example, flash memory) 104, communication interface 105, and the like. The model data of large-scale classifier Dm1, the model data of small-scale classifier Dm2, first learning data Dt1, second learning data Dt2, and the like, which are described above, are stored in external storage 104.

First learning unit 10, learning data generator 20, and second learning unit 30, which are described above, are implemented, for example, in such a manner that CPU 101 refers to control programs (for example, processing programs) and various data, which are stored in ROM 102, RAM 103, external storage 104, and the like. A part or all of the respective functions may be implemented by a process by a digital signal processor (DSP) in place of or in addition to the process by the CPU. Likewise, a part or all of the respective functions may be implemented by a process of a dedicated hardware circuit in place of or in addition to the process by the software.

Next, the respective configurations of learning apparatus 1 according to the present exemplary embodiment will be detailed with reference to FIGS. 2 and 5 to 10.

[First Learning Unit]

First learning unit 10 implements the learning process for large-scale classifier Dm1 by the class classification method using first learning data Dt1.

The machine learning of the class classification method is as described above with reference to FIG. 1. The learning process is implemented for large-scale classifier Dm1 such that the class applicable degree of the candidate class corresponding to the correct answer class, the class applicable degree being output by large-scale classifier Dm1, becomes the maximum as compared with the class applicable degrees of the other candidate classes.

When first learning unit 10 performs the learning process for large-scale classifier Dm1, for example, the cross entropy is used as a loss function. Then, by the publicly known error back propagation method and the like, the network parameters (weighting factor, bias, and the like) are optimized so as to minimize the loss function.

As described above, first learning data Dt1 is a data set of image data Dt1a and correct answer class data Dt1b. Plural pieces of first learning data Dt1 are stored in a storage unit (for example, external storage 104) in a state in which image data Dt1a and correct answer class data Dt1b are associated with each other. In the present exemplary embodiment, image data Dt1a is the image obtained by photographing the interior space of the vehicle, and correct answer class data Dt1b is any one of human class a, baggage class b, and empty seat class c.

FIG. 5 is a flowchart illustrating an example of the process performed by first learning unit 10.

In step S11, first learning unit 10 first determines whether there is unprocessed first learning data Dt1 that is not used for the learning process. When there is unprocessed first learning data Dt1 (S11: Yes), first learning unit 10 advances the process to step S12. When there is no unprocessed first learning data Dt1 (S11: No), first learning unit 10 advances the process to step S14 in order to end the process.

In step S12, first learning unit 10 acquires unprocessed first learning data Dt1 from the storage unit.

In step S13, first learning unit 10 implements the learning process for large-scale classifier Dm1 using first learning data Dt1. As described above, the class classification method is used for the learning process in this case. The learning process is implemented for large-scale classifier Dm1 such that the class applicable degree of the candidate class corresponding to the correct answer class, the class applicable degree being output by large-scale classifier Dm1, becomes the maximum as compared with the class applicable degrees of the other candidate classes. Then, first learning unit 10 returns to step S11.

In step S14, first learning unit 10 stores the model data (network parameter already subjected to the learning process) of large-scale classifier Dm1, the model data having been subjected to the learning process, in external storage 104 for example, and ends the processes.

By such a process as above, large-scale classifier Dm1 is optimized so as to be capable of outputting the class applicable degree indicating which of the respective candidate classes (human class a, baggage class b, and empty seat class c) is the likeliest for the classification target (image obtained by photographing the interior space of the vehicle).

[Learning Data Generator]

Learning data generator 20 performs the classification process for the classification target using large-scale classifier Dm1 already subjected to the learning process. In addition, based on a predetermined compression rule, learning data generator 20 converts the class applicable degrees for each of the plurality of candidate classes output by large-scale classifier Dm1 into dimensionally compressed values. Then, learning data generator 20 generates the second learning data in association with the classification target.

More specifically, learning data generator 20 is composed by including first classification processor 21 and compressor 22.

First classification processor 21 inputs the image (image data Dt2a) as the classification target to large-scale classifier Dm1 already subjected to the learning process, and outputs the class applicable degrees of candidate classes a, b, c from large-scale classifier Dm1 by image analysis using large-scale classifier Dm1 (for example, a forward propagation process of the neural network).

As the image to be input to first classification processor 21, image data Dt1a of first learning data Dt1 may be used, or an image different from image data Dt1a of first learning data Dt1 may be used.

Based on the predetermined compression rule, compressor 22 converts the respective class applicable degrees of the plurality of candidate classes a, b, c into the dimensionally compressed values (for example, one-dimensional compression values), associates the input image (image data Dt2a taken as the classification target in first classification processor 21) and one-dimensional compression value data Dt2b in that case with each other, and stores the associated input image and one-dimensional compression value data Dt2b as second learning data Dt2 for small-scale classifier Dm2.

Here, the compression rule for dimensionally compressing the class applicable degrees of candidate classes a, b, c will be described with reference to FIGS. 6A to 8.

Figure 6A:
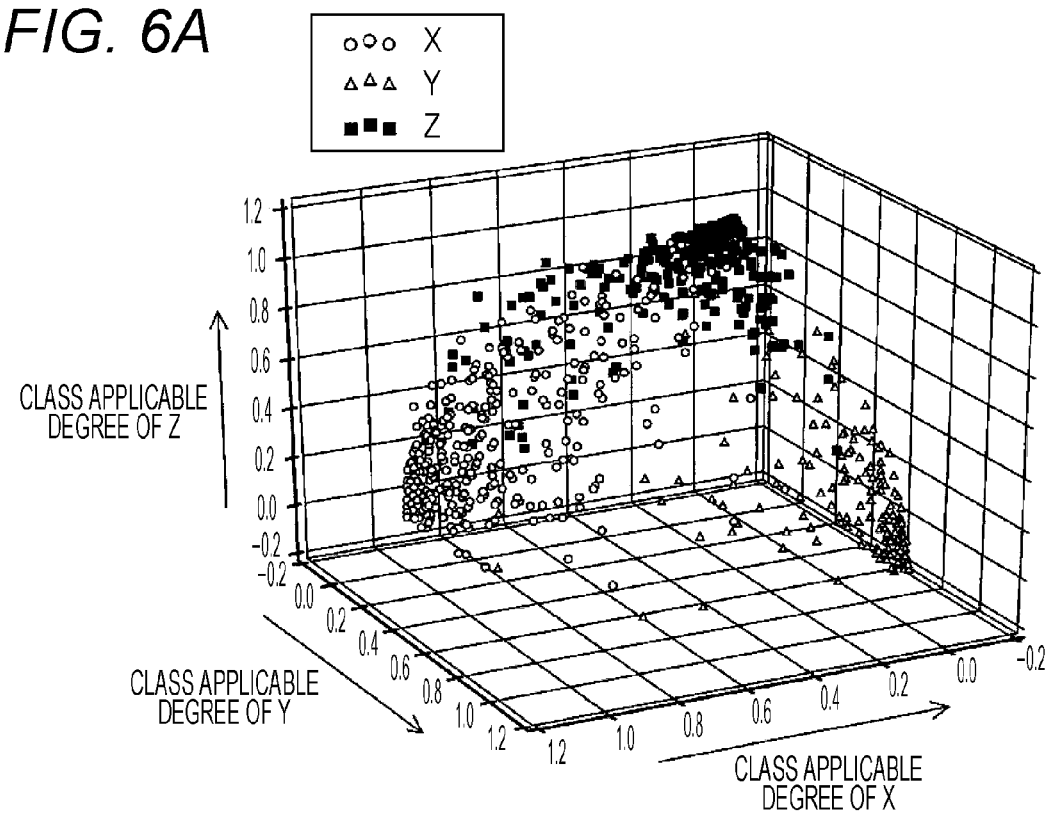
FIG. 6A is a view explaining classification separability between different classes according to the first exemplary embodiment.
Figure 6B:
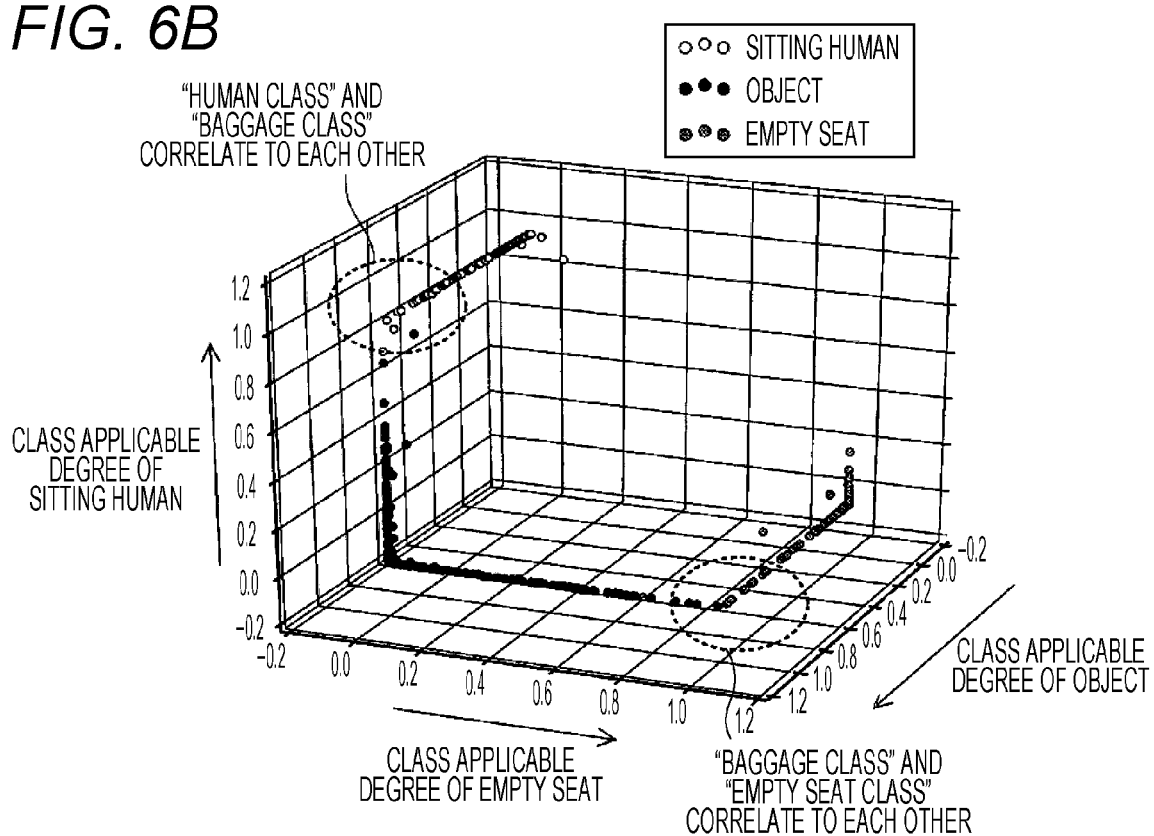
FIG. 6B is a view explaining classification separability between different classes according to the first exemplary embodiment.

FIGS. 6A and 6B are views explaining classification separability between different classes.

FIG. 6A illustrates an example of a state in which a covariance between the class applicable degrees is large between the different classes. FIG. 6B illustrates an example of a state in which the covariance between the class applicable degrees is small between the difference classes.

Each of dots illustrated in FIGS. 6A and 6B is a classification result of classifying the classification target in the classifier already subjected to the learning process. The dot is a point on a three-dimensional space, which indicates the class applicable degree for each of the three candidate classes. Each of scales on each axis represents the class applicable degree.

The respective dots in FIG. 6A indicate the following items.

Dot X: a class applicable degree of each candidate class in the case of classifying a classification target in which a correct answer class applies to candidate class X Dot Y: a class applicable degree of each candidate class in the case of classifying a classification target in which a correct answer class applies to candidate class Y Dot Z: a class applicable degree of each candidate class in the case of classifying a classification target in which a correct answer class applies to candidate class Z The respective dots in FIG. 6B indicate the following items.

Dot Sitting Human: a class applicable degree of each candidate class in the case of classifying a classification target in which a correct answer class applies to human class a Dot Object: a class applicable degree of a candidate class in the case of classifying a classification target in which a correct answer class applies to baggage class b Dot Empty Seat: a class applicable degree of a candidate class in the case of classifying a classification target in which a correct answer class applies to empty seat class c Generally, the classification separability depends on, for example, types of the candidate classes for classifying the classification targets. For example, when appearances of a certain candidate class and another candidate class on an image resemble each other, class applicable degrees thereof have correlation in the case of the classification process.

In this point, in FIG. 6A, there are a large number of dots where the class applicable degrees of the three candidate classes become substantially the same. For example, when the classification target applying to candidate class X is classified, not only the class applicable degree of candidate class X but also the class applicable degree of candidate class Y and the class applicable degree of candidate class Z are calculated as high values. Therefore, if the class applicable degrees of such candidate classes are dimensionally compressed, it is possible that the classification separability may decrease significantly.

Meanwhile, in FIG. 6B, a region where the class applicable degree of a certain candidate class and the class applicable degree of another candidate class become substantially the same (that is, a region with high correlation) includes only a region between "human class" and "baggage class" and a region between "empty seat class" and "baggage class". These regions with high correlation are appropriately coupled to each other, whereby it is possible to dimensionally compress the class applicable degrees of such candidate classes without decreasing the classification separability.

From such a viewpoint, in the present exemplary embodiment, more preferably, as the "candidate class to be dimensionally compressed", such candidate classes in only two of which have high similarity therebetween as shown in FIG. 6B are selected. In other words, such candidate classes in three or more of which simultaneously have high values of the class applicable degrees (candidate classes in three or more of which have high similarity therebetween) are not suitable as options for the candidate classes. As a matter of course, the candidate classes may include a candidate class that has no correlation with any of the candidate classes.

Figure 7A:
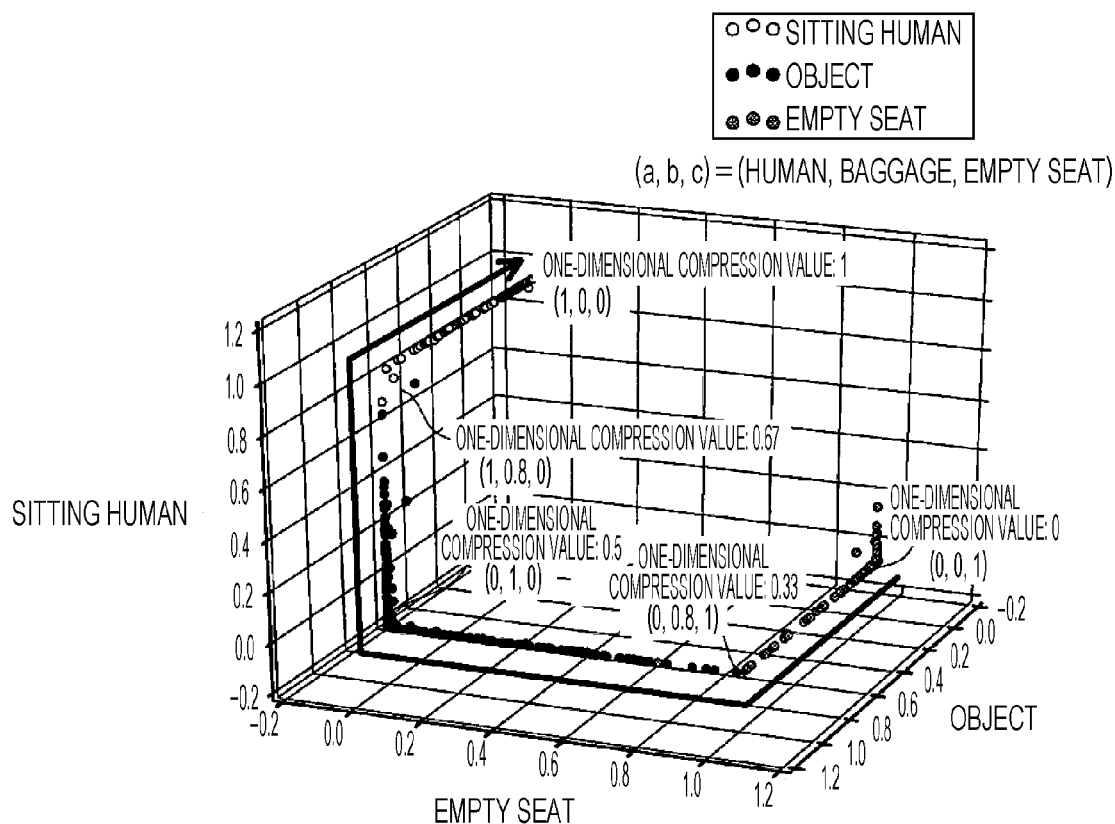
FIG. 7A is a view explaining an example of a compression rule according to the first exemplary embodiment.
Figure 7B:
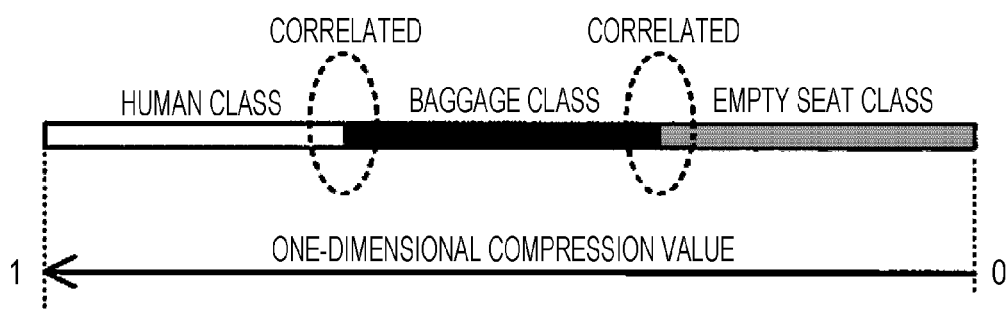
FIG. 7B is a view explaining the example of the compression rule according to the first exemplary embodiment.

FIGS. 7A, 7B, and 8 are views illustrating an example of the compression rule according to the present exemplary embodiment.

FIG. 7A is a view similar to FIG. 6B. FIG. 7B illustrates a state in which the class applicable degree of each of "human class a", "baggage class b" and "empty seat class c" is compressed into the one-dimensional compression value (refer to bold arrow in FIG. 7A; here, any value within a numeric range from 0 to 1).

FIG. 8 illustrates a specific example of relationships between the class applicable degrees of candidate classes a, b, c and the one-dimensional compression values. An item of "CLASS" in FIG. 8 represents actual classes (correct answer classes) of an image. An item of "CLASS APPLICABLE DEGREE" represents the class applicable degrees for each of human class a, baggage class b, and empty seat class c, the class applicable degrees being output as classification result of the image by large-scale classifier Dm1. An item of "EXPLANATION OF IMAGE" briefly explains types of the image. An item of "COMPRESSION TO ONE-DIMENSIONAL VALUE" represents one-dimensional compression values.

In the compression rule according to the present exemplary embodiment, for example, a minimum value of the one-dimensional compression value is set to 0, and a maximum value thereof is set to 1. The numeric range of 0 to 1 is divided into three. A numeric range of 1 to 0.67 is assigned to "human class". A numeric range of 0.67 to 0.33 is assigned to "baggage class". A numeric range of 0.33 to 0 is assigned to "empty seat class". Then, in the compression rule, first, a numeric range for the candidate class with the maximum class applicable degree is selected. Next, the class applicable degree with the second class applicable degree is taken into consideration, and the one-dimensional compression value is decided so as to deviate to the second candidate class.

For example, a typical human image corresponds to (1, 0, 0) as the class applicable degrees of candidate classes a, b, c. The class applicable degrees here are represented as a class applicable degree of a person, a class applicable degree of a baggage, and a class applicable degree of an empty seat). The one-dimensional compression value in this case is calculated as "1" since both of the class applicable degrees of "baggage class b" and "empty seat class c" are 0 in the numeric range (1 to 0.67) of "human class a".

Moreover, for example, a baggage image looking like a person corresponds to (0.8, 1, 0) as the class applicable degrees of candidate classes a, b, c. The one-dimensional compression value in this case is deviated to the numeric range (1 to 0.67) of "human class a" and is calculated as "0.6" since the class applicable degrees of "human class a" (with the second largest class applicable degree) is as large as 0.8 in the numeric range (0.67 to 0.33) of "baggage class b" with the maximum class applicable degree.

Meanwhile, for example, a baggage image looking like a baggage corresponds to (0, 1, 0.8) as the class applicable degrees of candidate classes a, b, c. The one-dimensional compression value in this case is deviated to the numeric range (0.33 to 0) of "empty seat class c" and is calculated as "0.4" since the class applicable degrees of "empty seat class c" (with the second largest class applicable degree) is as large as 0.8 in the numeric range (0.67 to 0.33) of "baggage class b" with the maximum class applicable degree.

Moreover, for example, an empty seat image looking like a baggage corresponds to (0, 0.8, 1) as the class applicable degrees of candidate classes a, b, c. The one-dimensional compression value in this case is deviated to the numeric range (0.67 to 0.33) of "baggage class b" and is calculated as "0.33" since the class applicable degrees of "baggage class b" (with the second largest class applicable degree) is as large as 0.8 in the numeric range (0.33 to 0) of "empty seat class c" with the maximum class applicable degree.

Note that the respective numeric ranges of candidate classes a, b, c are assigned such that the candidate classes with high similarity are adjacent to each other. The high similarity means that class applicable degrees of certain classification targets are increased simultaneously in some cases, and the same applies to the following. As described with reference to FIG. 6B, the similarity between "human class a" and "baggage class b" is high, and the similarity between "empty seat class c" and "baggage class b" is high. Hence, the region (0.67 to 0.33) of "baggage class b" is set between the region (1 to 0.67) of "human class a" and the region (0.33 to 0) of "empty class c".

In this way, the one-dimensional compression value expresses a covariance state of the class applicable degree of "human class a" and the class applicable degree of "baggage class b" when an image looking like both of a person and a baggage is classified at a value of about 0.66 between the region (1 to 0.67) of "human class a" and the region (0.67 to 0.33) of "baggage class b". Moreover, the one-dimensional compression value expresses a covariance state of the class applicable degree of "empty seat class c" and the class applicable degree of "baggage class b" when an image looking like both of an empty seat and a baggage is classified at a value of about 0.33 between the region (0.33 to 0) of "empty class c" and the region (0.67 to 0.33) of "baggage class b". That is, also in the one-dimensional compression value, class classification equivalent to that in the comparison between the class applicable degrees of candidate classes a, b, c is made possible.

The above compression rule is merely an example, and is changeable in various ways. For example, an occupancy of a specific candidate class in the numeric range (here, 0 to 1) of the one-dimensional compression value may be set large. Moreover, an occupancy of a region where different classes correlate with each other in the numeric range (here, 0 to 1) of the one-dimensional compression value may be set large. Moreover, the above compression rule may also consider the candidate class with the third largest class applicable degree. Furthermore, in the case of obtaining the one-dimensional compression value, there may be used a function to associate the class applicable degrees of candidate classes a, b, c with the one-dimensional compression value.

Figure 9:
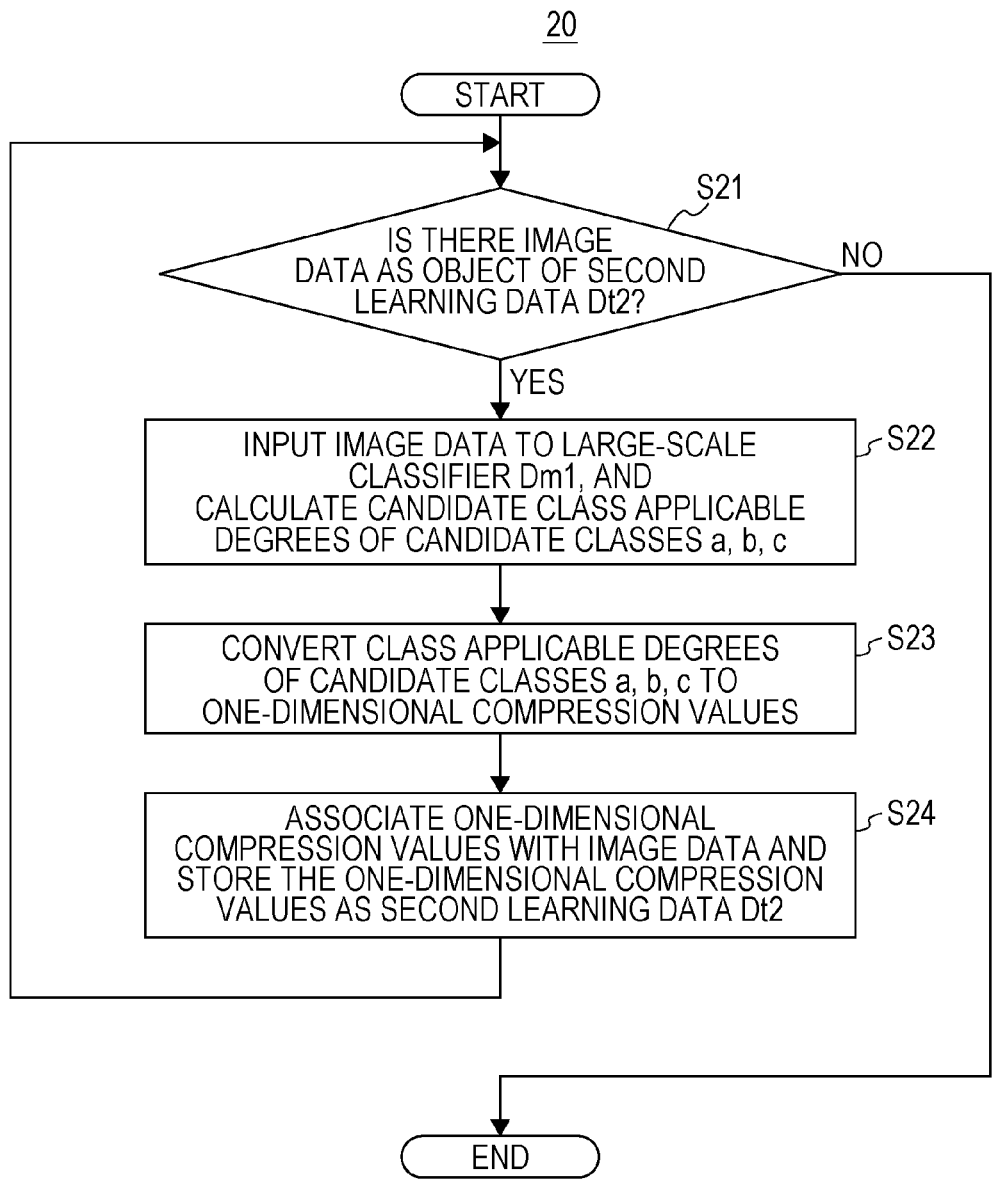
FIG. 9 is a flowchart illustrating an example of a process performed by a learning data generator according to the first exemplary embodiment.

FIG. 9 is a flowchart illustrating an example of a process performed by learning data generator 20.

In step S21, learning data generator 20 first determines whether there is unprocessed image data Dt2a to be targeted for second learning data Dt2. When there is unprocessed image data Dt2a (S21: Yes), learning data generator 20 advances the process to step S22. When there is no unprocessed image data Dt2a (S21: No), learning data generator 20 ends the processes.

In step S22, learning data generator 20 (first classification processor 21) inputs image data Dt2a to large-scale classifier Dm1 already subjected to the learning process, and calculates the class applicable degrees of candidate classes a, b, c by the image analysis using large-scale classifier Dm1 (for example, a forward propagation process of the neural network).

In step S23, in accordance with the above compression rule, learning data generator 20 (compressor 22) converts the class applicable degrees of candidate classes a, b, c to the one-dimensional compression value.

In step S24, learning data generator 20 (compressor 22) associates one-dimensional compression value data Dt2b with input image data Dt2a, and stores one-dimensional compression value data Dt2b in the storage unit (for example, external storage 104). Then, learning data generator 20 returns to step S21, and executes the process again.

By repeatedly executing such a process as above, learning data generator 20 generates a plurality of second learning data Dt2 (data in which one-dimensional compression value data Dt2b of the class applicable degrees and image data Dt2a are associated with each other).

[Second Learning Unit]

Second learning unit 30 implements the learning process for small-scale classifier Dm2 by the regression method using second learning data Dt2.

The machine learning of the regression method is as described above with reference to FIG. 1. The learning process is implemented for small-scale classifier Dm2 such that the classification result of the classification target classified by small-scale classifier Dm2 becomes one-dimensional compression value data Dt2b as a one-dimensional compression value of second learning data Dt2.

When second learning unit 30 performs the learning process for small-scale classifier Dm2, for example, a square error is used as a loss function. Then, by the publicly known error back propagation method and the like, the network parameters (weighting factor, bias, and the like) are optimized so as to minimize the loss function.

As described above, second learning data Dt2 is a data set of image data Dt2a and one-dimensional compression value data Dt2b of the class applicable degrees of candidate classes a, b, c. Plural pieces of second learning data Dt2 are stored in a storage unit (for example, external storage 104) in a state in which image data Dt2a and one-dimensional compression value data Dt2b are associated with each other. In the present exemplary embodiment, image data Dt2a is the image obtained by photographing the interior space of the vehicle.

Figure 10:
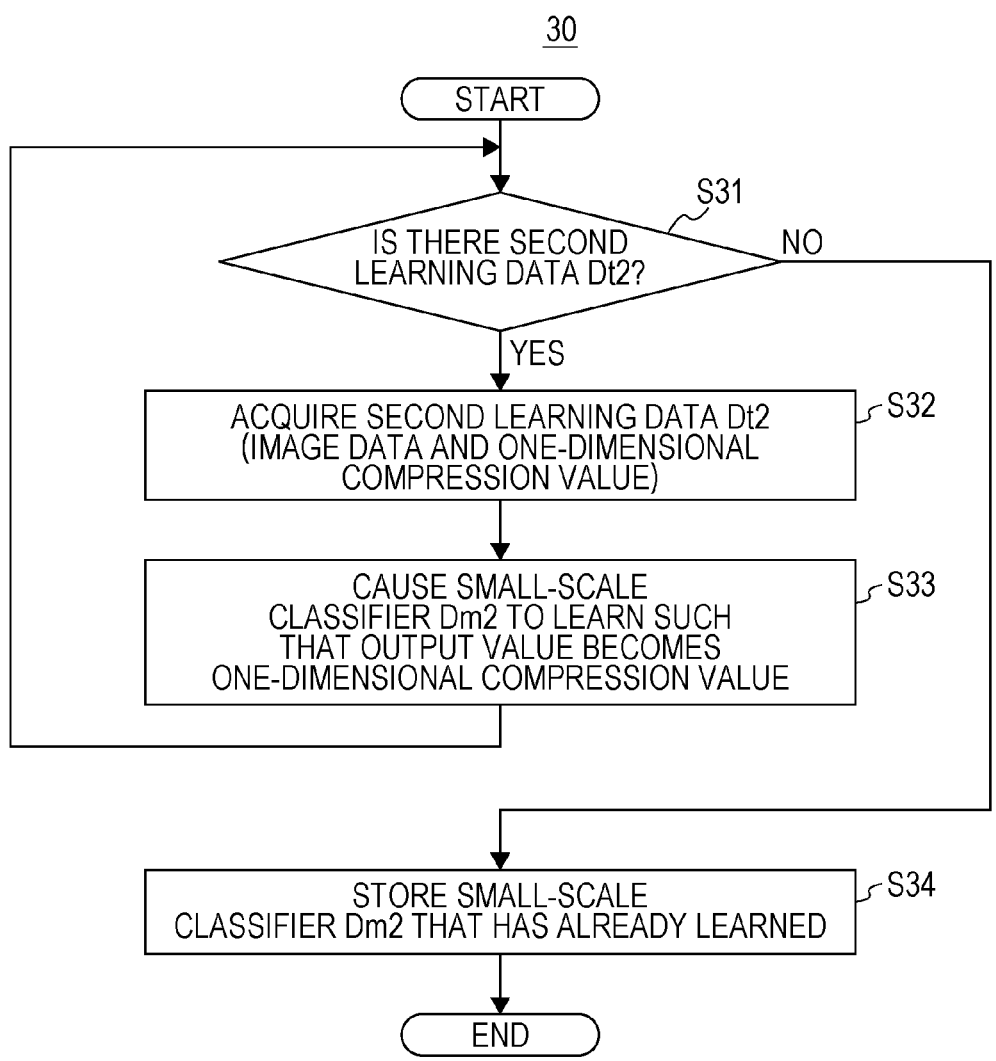
FIG. 10 is a flowchart illustrating an example of a learning process performed by a second learning unit according to the first exemplary embodiment.

FIG. 10 is a flowchart illustrating an example of the learning process performed by second learning unit 30.

In step S31, second learning unit 30 first determines whether there is unprocessed second learning data Dt2 that is not used for the learning process. When there is unprocessed second learning data Dt2 (S31: Yes), second learning unit 30 advances the process to step S32. When there is no unprocessed second learning data Dt2 (S31: No), second learning unit 30 advances the process to step S34 in order to end the processes.

In step S32, second learning unit 30 acquires unprocessed second learning data Dt2 from the storage unit.

In step S33, second learning unit 30 implements the learning process for small-scale classifier Dm2 using second learning data Dt2. As described above, the regression method is used for the learning process in this case. The learning process is implemented for small-scale classifier Dm2 such that the output value output by small-scale classifier Dm2 becomes one-dimensional compression value data Dt2b as the one-dimensional compression value of second learning data Dt2. Then, second learning unit 30 returns to step S31, and executes the process again.

In step S34, second learning unit 30 stores the model data (network parameter already subjected to the learning process) of small-scale classifier Dm2, the model data having been subjected to the learning process, in external storage 104, for example. Then, the flow is ended.

By such a process as above, small-scale classifier Dm2 is optimized so as to be capable of outputting the one-dimensional compression value restorable to the class applicable degrees of candidate classes a, b, c for the classification target (image obtained by photographing the interior space of the vehicle).

Effects

As described above, in the dark knowledge learning system, learning apparatus 1 according to the present exemplary embodiment generates second learning data Dt2 for small-scale classifier Dm2 using large-scale classifier Dm1 already subjected to the learning process in a state in which the class applicable degrees of candidate classes a, b, c are dimensionally compressed. Learning apparatus 1 implements the learning process for small-scale classifier Dm2 using second learning data Dt2 thus generated.

In this way, smaller small-scale classifier Dm2 can be configured while ensuring high classification performance. Moreover, in this way, it is possible to reduce the learning data in the case of implementing the learning process for small-scale classifier Dm2.

Particularly, learning apparatus 1 according to the present exemplary embodiment dimensionally compresses the class applicable degrees of candidate classes a, b, c using the compression rule in which the correlation in the classification process for candidate classes a, b, c is considered. In this way, it is possible to surely ensure high classification performance of small-scale classifier Dm2.

(Application Example of First Exemplary Embodiment)

Figure 11:
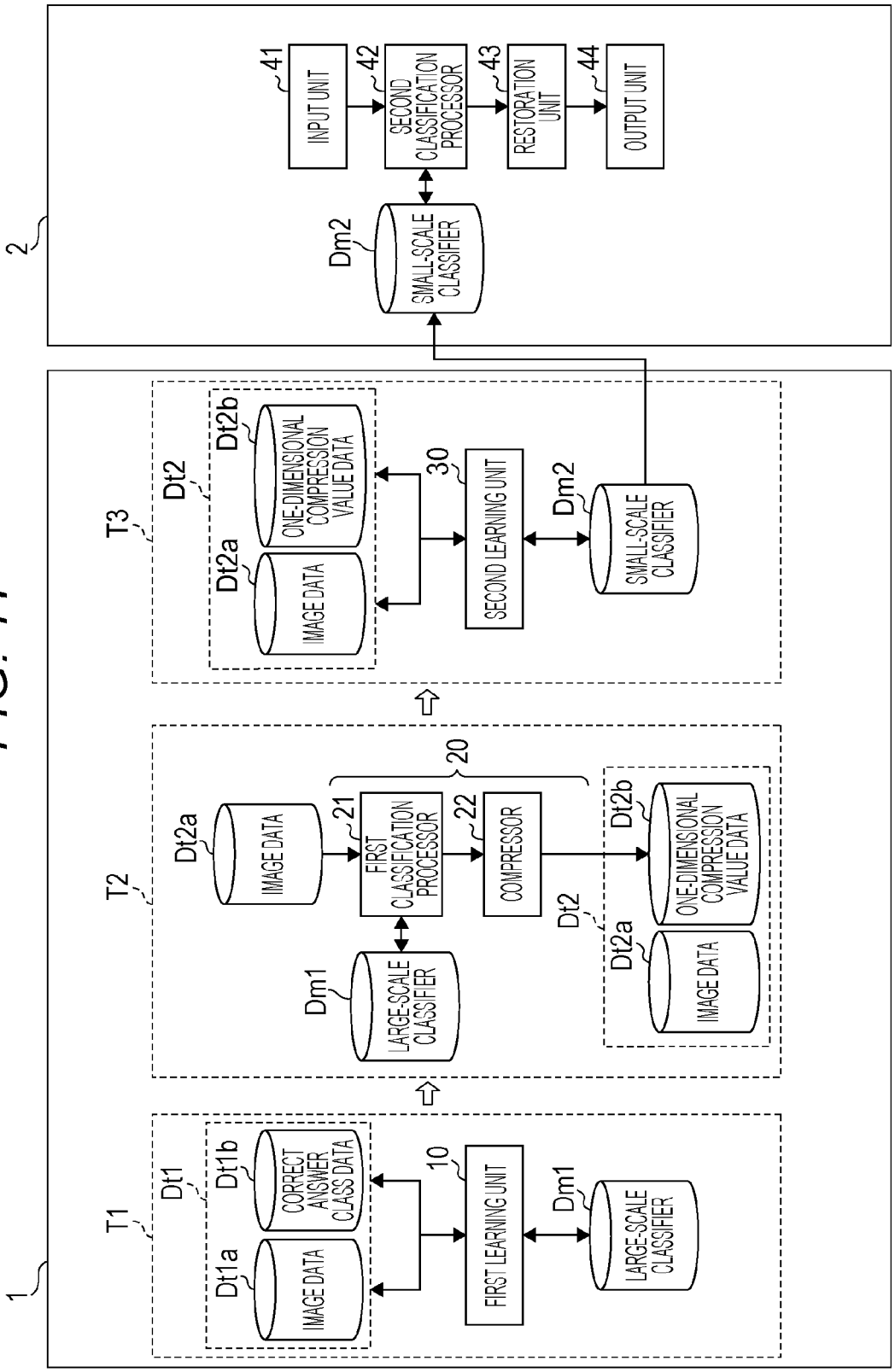
FIG. 11 is a diagram illustrating an application example of the learning apparatus according to the first exemplary embodiment.

FIG. 11 is a diagram illustrating an application example of learning apparatus 1 according to the first exemplary embodiment.

The application example according to the present exemplary embodiment is different from the first exemplary embodiment in that estimation apparatus 2 is provided. Note that a description of configurations common to those of the first exemplary embodiment will be omitted (the same also applies to the following other exemplary embodiments).

From learning apparatus 1, estimation apparatus 2 acquires the model data of small-scale classifier Dm2 already subjected to the learning process. Then, estimation apparatus 2 performs classification process for the input classification target using small-scale classifier Dm2, and classifies the classification target into any of the plurality of candidate classes based on the dimensionally compressed value output by small-scale classifier Dm2 and on the predetermined compression rule.

Like learning apparatus 1, estimation apparatus 2 is a computer including, as main components, a central processing unit (CPU), a read only memory (ROM), a random access memory (RAM), an external storage (for example, flash memory), a communication interface, and the like.

More specifically, estimation apparatus 2 is composed by including input unit 41, second classification processor 42, restoration unit 43, and output unit 44.

From a camera or the like, input unit 41 acquires an unclassified classification target (for example, an image obtained by photographing the interior space of the vehicle).

Second classification processor 42 classifies the classification target, which is acquired by input unit 41, using small-scale classifier Dm2 already subjected to the learning process.

Restoration unit 43 restores a one-dimensional compression value, which is output by second classification processor 42, to the class applicable degrees of candidate classes a, b, c in accordance with the compression rule (refer to FIG. 8).

Output unit 44 selects a candidate class with the maximum class applicable degree among the class applicable degrees of candidate classes a, b, c, the class applicable degrees being output by restoration unit 43, and outputs the selected candidate class as an classification result to the outside (for example, a display).

Estimation apparatus 2 according to the present exemplary embodiment is configured to restore the one-dimensional compression value to the class applicable degrees of candidate classes a, b, c. However, as a matter of course, estimation apparatus 2 may be configured to classify the classification target into any of the plurality of candidate classes a, b, c directly from the compression rule.

Figure 12:
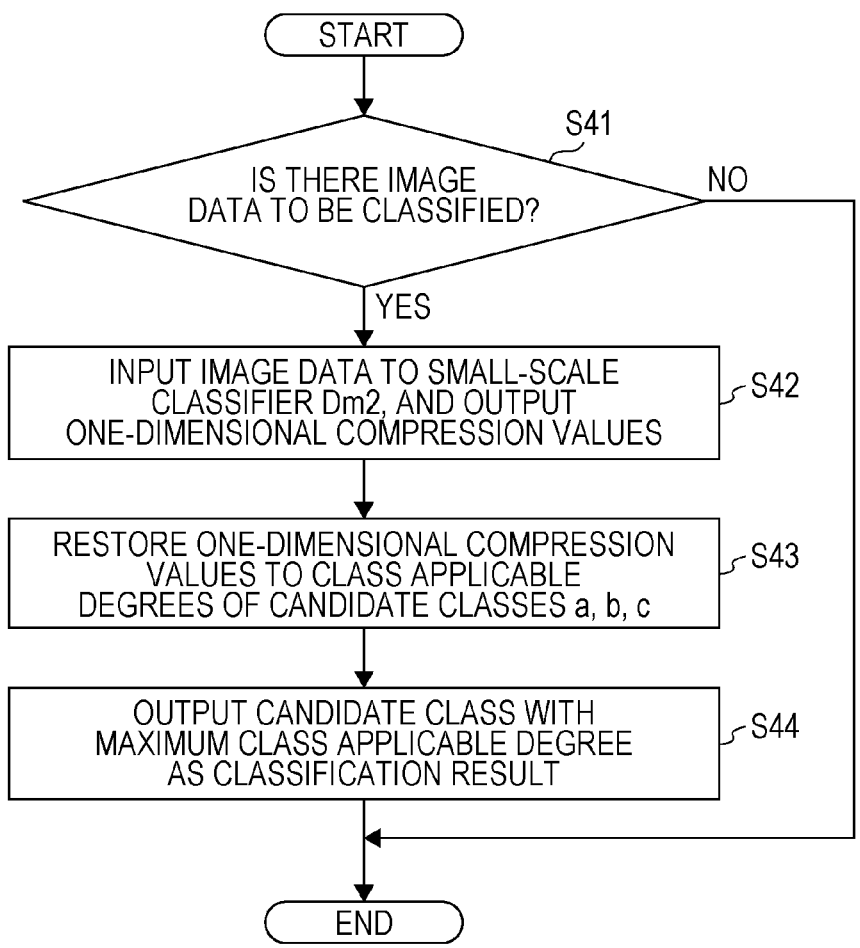
FIG. 12 is a flowchart illustrating an example of an estimation process performed by an estimation apparatus according to the first exemplary embodiment.

FIG. 12 is a flowchart illustrating an example of an estimation process performed by estimation apparatus 2.

In step S41, estimation apparatus 2 first determines whether there is image data to be classified. When there is image data to be classified (S41: Yes), estimation apparatus 2 advances the process to step S42. When there is no image data to be classified (S41: No), estimation apparatus 2 ends the processes.

In step S42, estimation apparatus 2 (second classification processor 42) inputs the image data to be classified to small-scale classifier Dm2 already subjected to the learning process, and calculates the one-dimensional compression value by the image analysis using small-scale classifier Dm2 (for example, the forward propagation process of the neural network).

In step S43, estimation apparatus 2 (restoration unit 43) restores the one-dimensional compression value, which is output by second classification processor 42, to the class applicable degrees of candidate classes a, b, c in accordance with the compression rule.

In step S44, estimation apparatus 2 (output unit 44) selects the candidate class with the maximum class applicable degree among the class applicable degrees of candidate classes a, b, c, the class applicable degrees being output by restoration unit 43, and outputs the selected candidate class as an classification result to the outside (for example, a display). Then, the processes are ended.

By such a configuration, estimation apparatus 2 classifies the classification target into any of the plurality of candidate classes using the model data of small-scale classifier Dm2 already subjected to the learning process, the model data being acquired from learning apparatus 1.

Second Exemplary Embodiment

Figure 13:
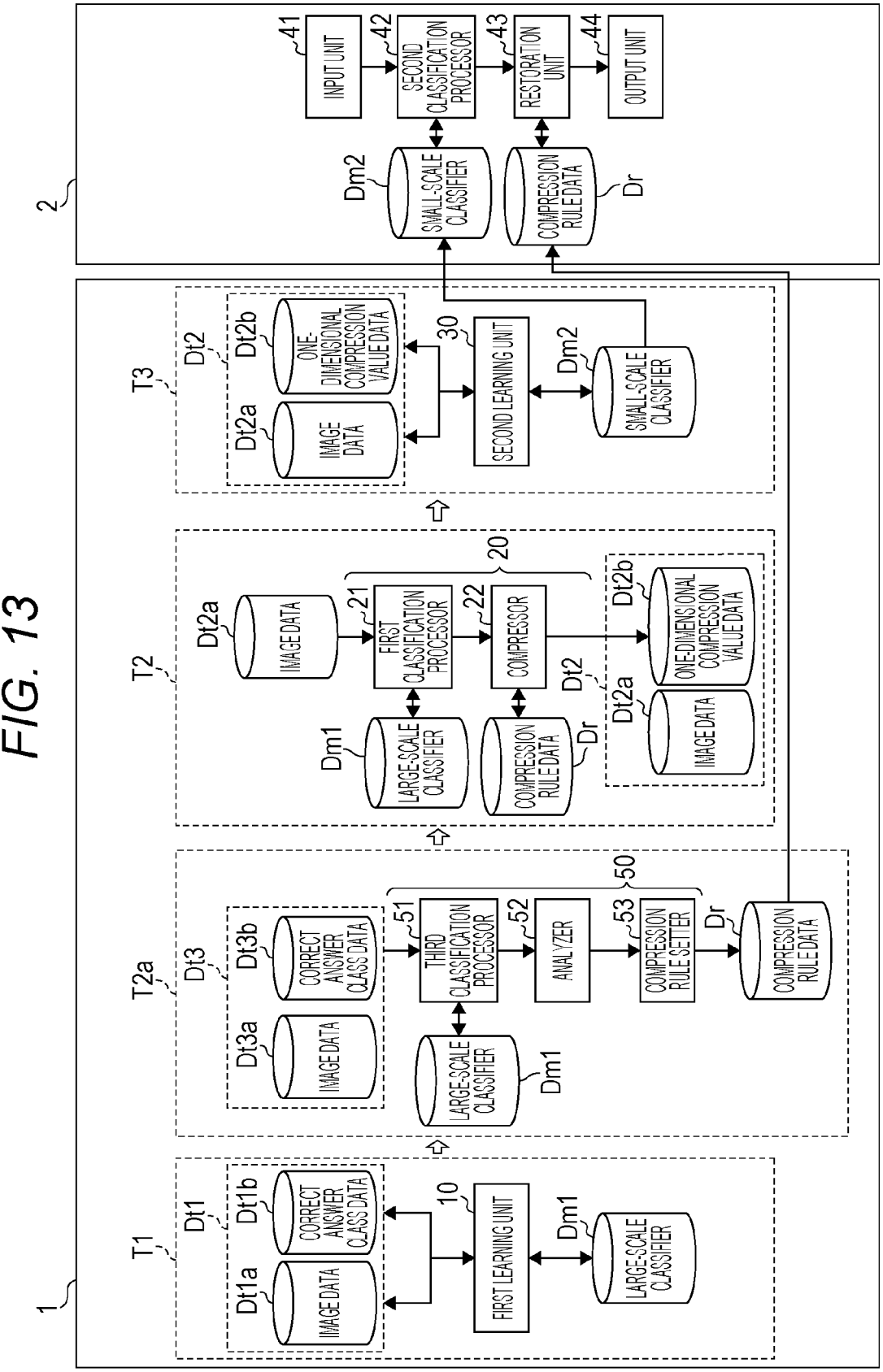
FIG. 13 is a diagram illustrating an example of a learning apparatus according to a second exemplary embodiment.

FIG. 13 is a diagram illustrating an example of a configuration of learning apparatus 1 according to a second exemplary embodiment.

Learning apparatus 1 according to the present exemplary embodiment is different from that of the first exemplary embodiment in including compression rule generator 50 for generating the above compression rule. Like the above application example of the first exemplary embodiment, FIG. 13 illustrates a configuration including estimation apparatus 2.

A process of compression rule generator 50 is executed in phase T2a situated after phase T1 where the learning process is implemented for large-scale classifier Dm1, and situated before phase T2 where second learning data Dt2 for small-scale classifier Dm2 is generated using large-scale classifier Dm1 already subjected to the learning process.

Compression rule generator 50 is composed by including third classification processor 51, analyzer 52, and compression rule setter 53.

Third classification processor 51 performs the classification process for the classification target using large-scale classifier Dm1 already subjected to the learning process, and generates the class applicable degrees of candidate classes a, b, c.

Analyzer 52 analyzes inter-class covariance states between the class applicable degrees of candidate classes a, b, c, which are generated by third classification processor 51.

Based on the inter-class covariance states generated by analyzer 52, compression rule setter 53 sets the above compression rule (compression rule data Dr as data of the compression rule).

Learning data generator 20 (compressor 22) and restoration unit 43 of estimation apparatus 2 refers to compression rule data Dr set by compression rule setter 53, and executes a similar process to that of the first exemplary embodiment.

Hereinafter, with reference to FIG. 14 to FIG. 17E, a description will be given of an example of the process when compression rule generator 50 generates the compression rule.

Compression rule generator 50 according to the present exemplary embodiment analyses the inter-class covariance states of the class applicable degrees of candidate classes a, b, c, for example, using third learning data Dt3 (data set of correct answer class data Dt3b and image data Dt3a) having a similar configuration to that of first learning data Dt1.

Third learning data Dt3 to be referred to by compression rule generator 50 may be the same data as first learning data Dt1. Meanwhile, compression rule generator 50 may directly obtain the inter-class covariances from the class applicable degrees of candidate classes a, b, c, which are output by third classification processor 51, without using correct answer class data Dt3b.

Figure 14:
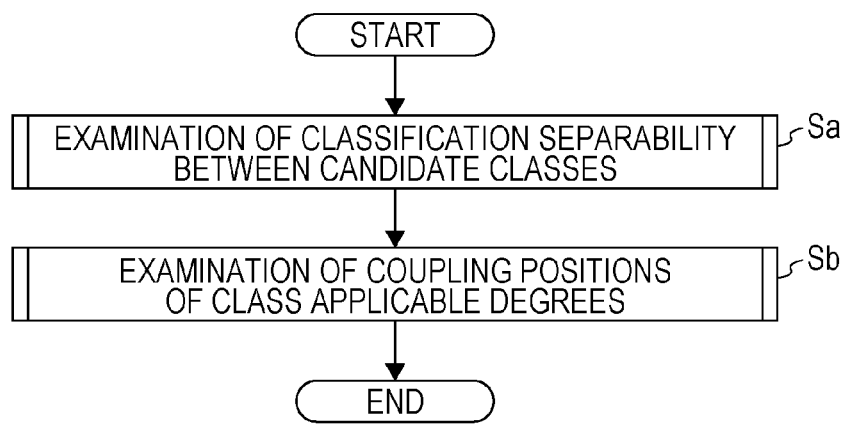
FIG. 14 is a flowchart illustrating an example of operations performed by a compression rule generator according to the second exemplary embodiment.
Figure 15:
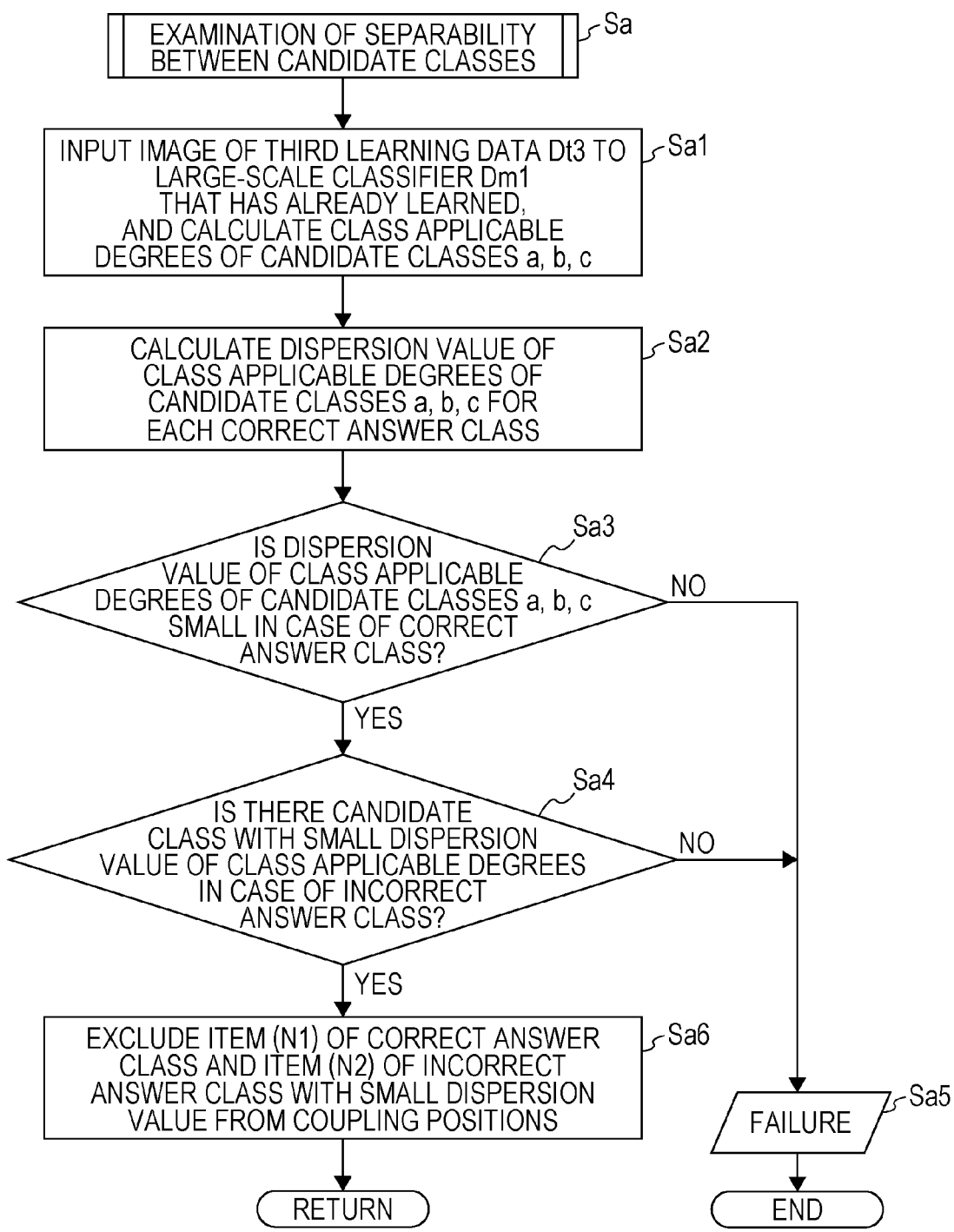
FIG. 15 is a flowchart illustrating the example of the operations performed by the compression rule generator according to the second exemplary embodiment.
Figure 16:
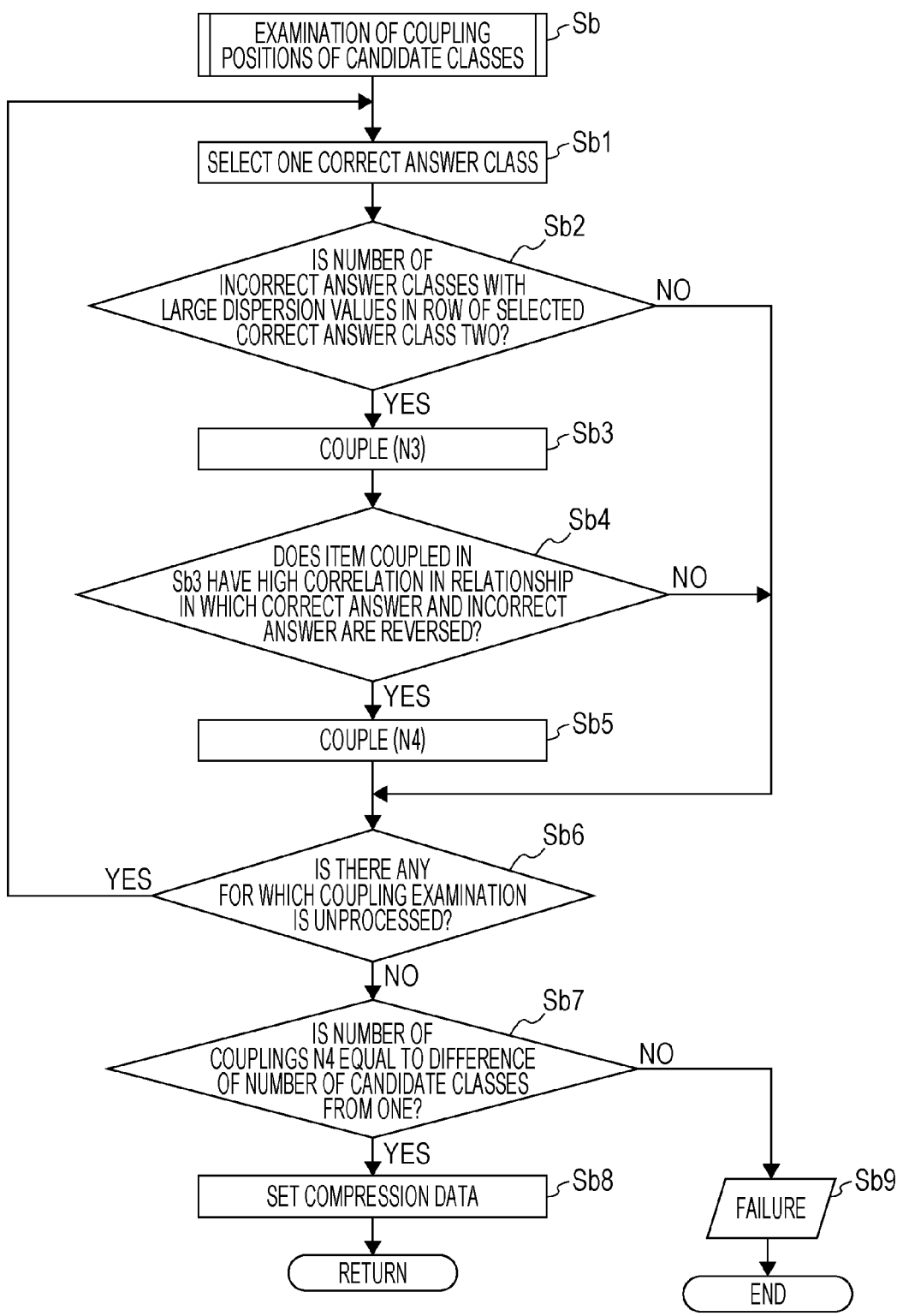
FIG. 16 is a flowchart illustrating the example of the operations performed by the compression rule generator according to the second exemplary embodiment.

FIGS. 14 to 16 are flowchart illustrating an example of operations performed by compression rule generator 50. Compression rule generator 50 performs examination Sa of the classification separability between the candidate classes (examination Sa will be described later with reference to FIG. 15), and thereafter, performs examination Sb of coupling positions of the class applicable degrees (examination Sb will be described later with reference to FIG. 16).

FIGS. 17A to 17E are views illustrating data tables referred to by compression rule generator 50. FIGS. 17A to 17E correspond to lists containing dispersion values of the class applicable degrees of candidate classes a, b, c, the dispersion values being calculated for each of correct answer classes. Analyzer 52 analyzes degrees of correlation between candidate classes a, b, c using the data tables in FIGS. 17A to 17E.

In step Sa1, third classification processor 51 inputs image data Dt3a of third learning data Dt3 to large-scale classifier Dm1 already subjected to the learning process, and outputs the class applicable degrees of candidate classes a, b, c by the image analysis (for example, the forward propagation process of the neural network).

In step Sa2, analyzer 52 calculates the dispersion values of the class applicable degrees for each of correct answer classes using the class applicable degrees of candidate classes a, b, c, which are generated in step Sa1 (refer to FIG. 17A).

In step Sa3, analyzer 52 determines whether the dispersion value of the class applicable degree of each of candidate classes a, b, c is a reference value (for example, $1.0 \times 10^{-5}$) or smaller in the case of the correct answer class. Then, when the dispersion value is smaller than the reference value (Sa3: Yes), analyzer 52 advances the process to step Sa4. Meanwhile, when the dispersion value is not smaller than the reference value (Sa3: No), analyzer 52 advances the process to step Sa5.

In step Sa3, analyzer 52 determines an extent of the classification separability between candidate classes a, b, c. When the dispersion value of any of the class applicable degrees is larger even in the case of the correct answer class (Sa3: No), analyzer 52 may determine that the extent of the classification separability from the other candidate classes is so small that the class applicable degree cannot be restored once being compressed to the one-dimensional compression value.

In step Sa4, analyzer 52 determines whether there is a candidate class in which the dispersion value of the class applicable degree of each of candidate classes a, b, c is the reference value (for example, $1.0 \times 10^{-5}$) or smaller in the case of the incorrect answer class. Then, when there is a candidate class in which the dispersion value is smaller than the reference value (Sa4: Yes), analyzer 52 advances the process to step Sa6. Meanwhile, when there is no candidate class in which the dispersion value is not smaller than the reference value (Sa4: No), analyzer 52 advances the process to step Sa5.

As in step Sa3, in step Sa4, analyzer 52 determines the extent of the classification separability between candidate classes a, b, c. The candidate class with a small dispersion value in the case of the incorrect answer class means to have high classification separability with respect to the correct answer class. That is, when there is no candidate class with a small dispersion value in the case of the incorrect answer class (Sa4: No), it may be determined that each of the candidate classes has a small extent of the classification separability from the other candidate classes and cannot be restored once being compressed to the one-dimensional compression value.

In step Sa5, analyzer 52 outputs a message that the generation of the compression rule has failed to a display or the like, and ends such routine processes of flow Sa.

In step Sa6, from the list of FIG. 17A, analyzer 52 excludes items (N1) of the correct answer class and items (N2) of the incorrect answer class with a small dispersion value from the coupling positions (refer to FIG. 17B), and proceeds to flow Sb in FIG. 16 for the examination of the coupling positions.

In the case of proceeding to flow Sb, items which are not included in the list in FIG. 17A are items with high degrees of inter-class correlations between candidate classes a, b, c, and serve as candidates for positions to be coupled.

In step Sb1, analyzer 52 selects one correct answer class from among candidate classes a, b, c.

In step Sb2, analyzer 52 determines whether a number of incorrect answer classes with dispersion values larger than the reference value (for example, $1.0 \times 10^{-5}$) in a row of the correct answer class is two in the list of FIG. 17B. For example, when the number of incorrect answer classes is two (Sb2: Yes), analyzer 52 advances the process to step Sb3. Meanwhile, when the number of incorrect answer classes is not two (Sb2: No), analyzer 52 advances the process to step Sb6.

In step Sb3, analyzer 52 performs coupling N3 for the selected two items (refer to FIG. 17C).

In FIG. 17C, in a row where the baggage class is the correct answer class, analyzer 52 couples the candidate class for the human class and the candidate class for the empty seat class. Such coupling means that analyzer 52 determines that the baggage class and the human class have correlation in the classification process.

In step Sb4, analyzer 52 determines whether the items coupled by N3 have high correlation also in a relationship in which the correct answer and incorrect answer are reversed. For example, on the basis of whether dispersion values of the items coupled by N3, in which the correct answer and the incorrect answer are reversed, are larger than the reference value (for example, $1.0 \times 10^{-5}$), analyzer 52 determines the correlation. For example, analyzer 52 determines whether both of the dispersion of the class applicable degree regarding the human class when the correct answer class is the baggage class and the dispersion of the class applicable degree regarding the baggage class when the correct answer class is the human class are high. When the correlation is high (SA: Yes), analyzer 52 advances the process to step Sb5. Meanwhile, when the correlation is low (Sb4: No) analyzer 52 advances the process to step Sb6.

In step Sb5, analyzer 52 performs coupling N4 for the two items selected in step Sb4 (refer to FIG. 17D).

Steps Sb4 and Sb5 correspond to a process for confirming the covariance states analyzed in steps Sb2 and Sb3. For example, in FIG. 17D, the dispersion value of the candidate class for human class a when baggage class b is the correct answer class and the dispersion value of the candidate class for baggage class b when human class a is the correct answer class are both large, and it can be said that both have correlation. Moreover, the dispersion value of the candidate class for empty seat class c when baggage class b is the correct answer class and the dispersion value of the candidate class for baggage class b when empty seat class c is the correct answer class are both large, and it can be said that both have correlation.

In step Sb6, analyzer 52 determines whether there is any for which the coupling examination is unprocessed. When there is one for which the coupling examination is unprocessed (Sb6: Yes), analyzer 52 returns to step Sb1, and repeats the process again. When there is none for which the coupling examination is unprocessed (Sb6: No), analyzer 52 advances the process to step Sb7.

In step Sb7, analyzer 52 determines whether a number of coupling N4 is a number reduced by one from a number of candidate classes. When the number of candidate classes is three, analyzer 52 determines whether the number of coupling N4 is two. Then, when the number of coupling N4 is the number reduced by one from the number of candidate classes (Sb7: Yes), analyzer 52 advances the process to step Sb8. Meanwhile, when the number of coupling N4 is less than the number reduced by one from the number of candidate classes (Sb7: No), analyzer 52 advances the process to step Sb9.

When such a condition in step Sb7 is satisfied, it can be determined that only each pair of the first candidate class and the second candidate class (here, human class a and baggage class b) and the second candidate class and the third candidate class (here, baggage class b and empty seat class c) has high correlation in the case of the classification process. In other words, it is possible to express the class applicable degrees of candidate classes a, b, c as the one-dimensional compression value.

In step Sb8, compression rule setter 53 sets the compression rule based on coupling N3 and coupling N4, which are described above (refer to FIG. 17E).

For example, in order of the coupling by coupling N4, compression rule setter 53 evenly sets the numeric ranges of the respective class applicable degrees of candidate classes a, b, c. For example, compression rule setter 53 sets the numeric range of empty seat class c to 0 to 0.33, the numeric range of baggage class b to 0.33 to 0.67, and the numeric range of human class a to 0.67 to 1.0. Then, compression rule setter 53 sets the numeric range of each class applicable degree of candidate classes a, b, c such that the numeric range comes close to a boundary with the numeric range of the other candidate class as the correlation in the classification process with the other candidate class (this correlation is similarity in the image) is increased. For example, compression rule setter 53 sets the numeric range for a baggage image looking like human to 0.6, and sets the numeric range for a human image looking like a baggage to 0.7.

As described above, compression rule generator 50 can set a similar compression rule to that of the first exemplary embodiment. Then, compression rule generator 50 ends such a routine process of flow Sb for the examination of the coupling positions.

Note that, In step Sb9, compression rule generator 50 outputs a message that the generation of the compression rule has failed to a display or the like, and ends the flows.

As described above, in accordance with learning apparatus 1 according to the present exemplary embodiment, using large-scale classifier Dm1 already subjected to the learning process, the degrees of inter-class correlations between the class applicable degrees for each of the plurality of candidate classes a, b, c, are analyzed, and the compression rule is generated using a result of the analysis.

In this way, it is possible to generate an appropriate compression rule even when the compression rule is not set in advance, for example, when the candidate classes having correlation is not obvious in the classification process.

Moreover, in accordance with learning apparatus 1 according to the present exemplary embodiment, the degrees of inter-class correlations are calculated as the dispersion of the class applicable degrees for each of the plurality of candidate classes a, b, c for each correct answer class. Hence, it is possible to easily analyze the degrees of inter-class correlations.

Note that, in the present exemplary embodiment, estimation apparatus 2 is configured to acquire compression rule data Dr in addition to the model data of small-scale classifier Dm2 already subjected to the learning process from learning apparatus 1, and to classify the classification target into any of the plurality of candidate classes.

(Modification of Second Exemplary Embodiment)

As a matter of course, compression rule generator 50 according to the present exemplary embodiment is also applicable to the case where the number of candidate classes is four.

FIGS. 18A to 18D are views schematically illustrating a process of compression rule generator 50. Note that, like FIGS. 17A to 17E, FIGS. 18A to 18D are data tables to be referred to by compression rule generator 50. FIGS. 18A to 18D correspond to lists containing dispersion values of the class applicable degrees of candidate classes A, B, C, D, the dispersion values being calculated for each of the correct answer classes.

A specific process performed by compression rule generator 50 in this case is similar to that in the flowcharts in FIGS. 14 to 16, and accordingly, a detailed description thereof will be omitted here.

First, using class applicable degrees of candidate classes A, B, C, D, compression rule generator 50 calculates the dispersion values of the class applicable degrees for each of correct answer classes (refer to FIG. 18A).

Next, from the list of FIG. 18A, compression rule generator 50 excludes items (N1) of the correct answer classes and items (N2) of incorrect answer classes with small dispersion values from coupling positions (refer to FIG. 18B).

Next, in the list of FIG. 18B, compression rule generator 50 performs coupling (N3) for two items of incorrect answer classes with large dispersion values in a row of the correct answer class (refer to FIG. 18C).

Next, when the items coupled by N3 have high correlation in a relationship in which the correct answer and the incorrect answer are reversed (when the items are subjected to covariance) in the list of FIG. 18C, compression rule generator 50 performs coupling (N4) for the two items (refer to FIG. 18C).

When the number of coupling N4 thus generated is the number reduced by one from the number of candidate classes (here, three), it can be determined that only each pair of the first candidate class and the second candidate class (here, class A and class B), the second candidate class and the third candidate class (here, class B and class C) and the third candidate class and the fourth candidate class (here, class C and class D) has high correlation in the case of the classification process. Hence, it is possible to express the class applicable degrees of candidate classes A, B, C, D as the one-dimensional compression value.

In this way, compression rule generator 50 can set the compression rule as in the case where the number of candidate classes is three (refer to FIG. 18D).

Other Exemplary Embodiments

The present disclosure is not limited to the above exemplary embodiments, and various modifications are conceivable.

In the above exemplary embodiments, as an example of small-scale classifier Dm2, a mode is illustrated in which only the class of the single classification target is classified. However, small-scale classifier Dm2 may be configured to be capable of classifying classes of a plurality of classification targets. For example, small-scale classifier Dm2 may be configured to include an output element for outputting, from an input image, a class applicable degree of a candidate class regarding a total number of persons present in the vehicle (for example, the candidate class is "two-person class", "three-person class", or "four-person class), in addition to the output element for outputting, form one input image, the class applicable degree regarding the empty state of the passenger's seat (for example, the candidate class is "human class", "baggage class" or "empty seat class" for the passenger's seat). According to the present disclosure, for example, the learning data can be reduced, and accordingly, such a mode leads to reduction of interference with the element for classifying the classes of the other classification target.

Moreover, in the above exemplary embodiments, as an example of the compression rule, the mode is illustrated in which the class applicable degrees of the plurality of candidate classes are compressed to the one-dimensional value; however, a configuration of compressing the class applicable degrees to, for example, two-dimensional values may also be adopted. In that case, the class applicable degrees of the plurality of candidate classes just need to be converted into one point on a two-dimensional coordinate. Note that, also in such a mode, the compression rule may be configured to assign the numeric range of the dimensionally compressed value to each of the plurality of candidate classes such that the candidate classes having correlation are adjacent to each other in the classification process, and to convert each of the plurality of candidate classes into the dimensionally compressed value on the basis of the class applicable degree for each of the plurality of candidate classes such that each of the plurality of candidate classes approaches the second candidate class having the second largest class applicable degree in the numeric range corresponding to the first candidate class having the largest class applicable degree.

Moreover, in the above exemplary embodiments, as an example of the operations of learning apparatus 1, first learning unit 10, learning data generator 20, and second learning unit 30 are sequentially executed. However, as a matter of course, a part or all of the steps by these units may be executed in parallel.

Moreover, in the above exemplary embodiments, as an example is illustrated in which the configuration of learning apparatus 1 is implemented by the single computer; however, as a matter of course, may be implemented by a plurality of computers. Moreover, the programs and the data, which are read out by the computer, and the data and the like, which are written by the computer, may be stored in a plurality of computers in a dispersed manner.

Although specific examples of the present disclosure are detailed above, these are mere exemplifications and do not limit the scope of claims. The technique described in the claims includes various variations and changes of the specific examples exemplified above.

At least the following matter will be apparent from the description of the specification and the accompanying drawings.

Learning apparatus 1 of the present disclosure includes first learning unit 10, learning data generator 20, and second learning unit 30. First learning unit 10 implements a first learning process for a first classifier such that, when the first classifier performs a classification process for classifying a classification target into a plurality of candidate classes including a correct answer class of the classification target and other candidate classes using first learning data in which the classification target is associated with the correct answer class, a class applicable degree of a candidate class corresponding to the correct answer class becomes maximum as compared with class applicable degrees of the other candidate classes. The class applicable degree is output as a result of the classification process by the first classifier. Learning data generator 20 performs the classification process for the classification target using the first classifier already subjected to the first learning process, converts class applicable degrees of the plurality of candidate classes into a dimensionally compressed value based on a predetermined compression rule, and generates second learning data in which the classification target is associated with the dimensionally compressed value. The class applicable degrees are output as the result of the classification process by the first classifier already subjected to the first learning process. Second learning unit 30 implements a second learning process for a second classifier different from the first classifier such that, when the second classifier performs the classification process for the classification target using the second learning data, class applicable degrees of the plurality of candidate classes become the dimensionally compressed value. The class applicable degrees are output as a result of the classification process by the second classifier.

In accordance with learning apparatus 1, smaller small-scale classifier Dm2 can be configured while ensuring high classification performance. Moreover, in accordance with learning apparatus 1, it is possible to reduce the learning data in the case of implementing the learning process for small-scale classifier Dm2.

In learning apparatus 1 of the present disclosure, the dimensionally compressed value may be any value in a region obtained by dividing a predetermined numeric range for each of a plurality of candidate classes such that candidate classes having high similarity are adjacent to each other. The predetermined compression rule may allow the conversion such that, in the predetermined numeric range corresponding to a first candidate class having a largest class applicable degree, the dimensionally compressed value deviates toward the predetermined numeric range corresponding to a second candidate class in response to a class applicable degree of the second candidate class. The second candidate class has a second largest class applicable degree.

In accordance with learning apparatus 1, it is possible to surely ensure high classification performance of small-scale classifier Dm2.

Learning apparatus 1 of the present disclosure may further include compression rule generator 50 that performs the classification process for the classification target using the first classifier already subjected to the first learning process, that obtains degrees of inter-class correlation from class applicable degrees of the plurality of candidate classes, and that generates the predetermined compression rule based on the degrees of correlation. The class applicable degrees are output by the first classifier.

In accordance with learning apparatus 1, it is possible to generate an appropriate compression rule even when the compression rule is not set in advance, for example, when the candidate classes having correlation is not obvious in the classification process.

In learning apparatus 1 of the present disclosure, compression rule generator 50 may determine the degrees of inter-class correlation by the dispersion of the class applicable degrees for each of the plurality of candidate classes for each of the correct answer classes.

In accordance with learning apparatus 1, it is possible to easily analyze the degrees of inter-class correlations.

In learning apparatus 1 of the present disclosure, the plurality of candidate classes a, b, c may include at least three candidate classes.

In learning apparatus 1 of the present disclosure, each of the first classifier and the second classifier may include a neural network.

In learning apparatus 1 of the present disclosure, the classification target may be image data.

Estimation apparatus 2 of the present disclosure performs the classification process for the classification target to be input using the second classifier already subjected to the learning process and classifies the classification target into any of the plurality of candidate classes based on the predetermined compression rule and the dimensionally compressed value from the plurality of candidate classes. The dimensionally compressed value is output as the result of the classification process by the second classifier already subjected to the learning process.

A learning method of the present disclosure includes implementing a first learning process for a first classifier such that, when the first classifier performs a classification process for classifying a classification target into a plurality of candidate classes including a correct answer class of the classification target and other candidate classes using first learning data in which the classification target is associated with the correct answer class, a class applicable degree of a candidate class corresponding to the correct answer class becomes maximum as compared with class applicable degrees of the other candidate classes. The class applicable degree is output as a result of the classification process by the first classifier. Moreover, the learning method includes performing the classification process for the classification target using the first classifier already subjected to the first learning process, converting class applicable degrees of the plurality of candidate classes into a dimensionally compressed value based on a predetermined compression rule, and generating second learning data in which the classification target is associated with the dimensionally compressed value. The class applicable degrees are output as the result of the classification process by the first classifier already subjected to the first learning process. Furthermore, the learning method includes implementing a second learning process for a second classifier different from the first classifier such that, when the second classifier performs the classification process for the classification target using the second learning data, class applicable degrees of the plurality of candidate classes become the dimensionally compressed value. The class applicable degrees are output as a result of the classification process by the second classifier.

An estimation method of the present disclosure includes performing the classification process for the classification target to be input using the second classifier already subjected to the second learning process described above, and classifying the classification target into any of the plurality of candidate classes based on the predetermined compression rule and the dimensionally compressed value from the plurality of candidate classes. The dimensionally compressed value is output as the result of the classification process by the second classifier already subjected to the second learning process.

A non-transitory computer-readable storage medium of the present disclosure records a learning program. The learning program causes the computer to execute implementing a first learning process for a first classifier such that, when the first classifier performs a classification process for classifying a classification target into a plurality of candidate classes including a correct answer class of the classification target and other candidate classes using first learning data in which the classification target is associated with the correct answer class, a class applicable degree of a candidate class corresponding to the correct answer class becomes maximum as compared with class applicable degrees of the other candidate classes. The class applicable degree is output as a result of the classification process by the first classifier. Moreover, the learning program causes the computer to execute performing the classification process for the classification target using the first classifier already subjected to the first learning process, converting class applicable degrees of the plurality of candidate classes into a dimensionally compressed value based on a predetermined compression rule, and generating second learning data in which the classification target is associated with the dimensionally compressed value. The class applicable degrees are output as the result of the classification process by the first classifier already subjected to the first learning process. Furthermore, the learning program causes the computer to execute implementing a second learning process for a second classifier different from the first classifier such that, when the second classifier performs the classification process for the classification target using the second learning data, class applicable degrees of the plurality of candidate classes become the dimensionally compressed value. The class applicable degrees being output as a result of the classification process by the second classifier.

Another non-transitory computer-readable storage medium of the present disclosure records an estimation program. The estimation program causes the computer to execute performing the classification process for the classification target to be input using the second classifier already subjected to the second learning process described above, and classifying the classification target into any of the plurality of candidate classes based on the predetermined compression rule and the dimensionally compressed value from the plurality of candidate classes, the dimensionally compressed value being output as the result of the classification process by the second classifier already subjected to the second learning process.

In accordance with the present disclosure, it is possible to achieve the further miniaturization of the classifier, and the classifier is useful for the learning apparatus and the like.

What is claimed is:

1. A learning apparatus comprising:
a processor; and
a memory storing instructions that, when executed by the processor, cause the processor to perform operations including:
implementing a first learning process for a first classifier such that, when the first classifier performs a classification process for classifying a classification target into a plurality of candidate classes including a correct answer class of the classification target and other candidate classes using first learning data in which the classification target is associated with the correct answer class, a class applicable degree of a candidate class corresponding to the correct answer class becomes maximum as compared with class applicable degrees of the other candidate classes, the class applicable degree being output as a result of the classification process by the first classifier;
performing the classification process for the classification target using the first classifier already subjected to the first learning process, converting class applicable degrees of the plurality of candidate classes into a dimensionally compressed value based on a predetermined compression rule, the class applicable degrees being output as the result of the classification process by the first classifier already subjected to the first learning process, and generating second learning data in which the classification target is associated with the dimensionally compressed value; and
implementing a second learning process for a second classifier different from the first classifier such that, when the second classifier performs the classification process for the classification target using the second learning data, class applicable degrees of the plurality of candidate classes become the dimensionally compressed value, the class applicable degrees being output as a result of the classification process by the second classifier.

2. The learning apparatus according to claim 1, wherein
the dimensionally compressed value is any value in a predetermined numeric range of a region segmented for each of the plurality of candidate classes,
the predetermined numeric range of the region for each of the plurality of candidate classes is assigned such that candidate classes having high similarity are adjacent to each other, and
the predetermined compression rule allows the conversion such that, in the predetermined numeric range corresponding to a first candidate class having a largest class applicable degree among the plurality of candidate classes, the dimensionally compressed value deviates toward the predetermined numeric range corresponding to a second candidate class in response to a class applicable degree of the second candidate class, the second candidate class having a second largest class applicable degree.

3. The learning apparatus according to claim 2, wherein the operations further include:
performing the classification process for the classification target using the first classifier already subjected to the first learning process, obtaining degrees of correlation between the plurality of candidate classes from class applicable degrees of the plurality of candidate classes, the class applicable degrees being output as the result of the classification process by the first classifier already subjected to the first learning process, and generating the predetermined compression rule based on the degrees of correlation.

4. The learning apparatus according to claim 3, wherein obtaining the degrees of correlation includes determining the degrees of correlation between the plurality of candidate classes by dispersion of class applicable degrees of each of the plurality of candidate classes corresponding to the correct answer class.

5. The learning apparatus according to claim 1, wherein the dimensionally compressed value is a value obtained by compressing the class applicable degrees of the plurality of candidate classes into one dimension.

6. The learning apparatus according to claim 1, wherein the plurality of candidate classes include at least three candidate classes including the correct answer class and the other candidate classes.

7. The learning apparatus according to claim 1, wherein each of the first classifier and the second classifier includes a neural network.

8. The learning apparatus according to claim 1, wherein the classification target is image data.

9. An estimation apparatus comprising:
a processor; and
a memory storing instructions that, when executed by the processor, cause the processor to perform operations including:
performing the classification process for the classification target to be input using the second classifier already subjected to the second learning process by the learning apparatus according to claim 1, and classifying the classification target into the plurality of candidate classes based on the predetermined compression rule and the dimensionally compressed value from the plurality of candidate classes, the dimensionally compressed value being output as the result of the classification process by the second classifier already subjected to the second learning process.

10. A learning method comprising:
implementing a first learning process for a first classifier such that, when the first classifier performs a classification process for classifying a classification target into a plurality of candidate classes including a correct answer class of the classification target and other candidate classes using first learning data in which the classification target is associated with the correct answer class, a class applicable degree of a candidate class corresponding to the correct answer class becomes maximum as compared with class applicable degrees of the other candidate classes, the class applicable degree being output as a result of the classification process by the first classifier;
performing the classification process for the classification target using the first classifier already subjected to the first learning process, converting class applicable degrees of the plurality of candidate classes into a dimensionally compressed value based on a predetermined compression rule, the class applicable degrees being output as the result of the classification process by the first classifier already subjected to the first learning process, and generating second learning data in which the classification target is associated with the dimensionally compressed value; and
implementing a second learning process for a second classifier different from the first classifier such that, when the second classifier performs the classification process for the classification target using the second learning data, class applicable degrees of the plurality of candidate classes become the dimensionally compressed value, the class applicable degrees being output as a result of the classification process by the second classifier.

11. An estimation method comprising performing the classification process for the classification target to be input using the second classifier already subjected to the second learning process by the learning method according to claim 10, and classifying the classification target into the plurality of candidate classes based on the predetermined compression rule and the dimensionally compressed value from the plurality of candidate classes, the dimensionally compressed value being output as the result of the classification process by the second classifier already subjected to the second learning process.

12. A non-transitory computer-readable storage medium recording a learning program, the learning program causing a computer to execute:

implementing a first learning process for a first classifier such that, when the first classifier performs a classification process for classifying a classification target into a plurality of candidate classes including a correct answer class of the classification target and other candidate classes using first learning data in which the classification target is associated with the correct answer class, a class applicable degree of a candidate class corresponding to the correct answer class becomes maximum as compared with class applicable degrees of the other candidate classes, the class applicable degree being output as a result of the classification process by the first classifier;

performing the classification process for the classification target using the first classifier already subjected to the first learning process, converting class applicable degrees of the plurality of candidate classes into a dimensionally compressed value based on a predetermined compression rule, the class applicable degrees being output as the result of the classification process by the first classifier already subjected to the first learning process, and generating second learning data in which the classification target is associated with the dimensionally compressed value; and implementing a second learning process for a second classifier different from the first classifier such that, when the second classifier performs the classification process for the classification target using the second learning data, class applicable degrees of the plurality of candidate classes become the dimensionally compressed value, the class applicable degrees being output as a result of the classification process by the second classifier.

13. A non-transitory computer-readable storage medium recording an estimation program, the estimation program causing a computer to execute performing the classification process for the classification target to be input using the second classifier already subjected to the second learning process by the learning program recorded in the non-transitory computer-readable storage medium according to claim 12, and classifying the classification target into the plurality of candidate classes based on the predetermined compression rule and the dimensionally compressed value from the plurality of candidate classes, the dimensionally compressed value being output as the result of the classification process by the second classifier already subjected to the second learning process.

* * * * *